(12) United States Patent
Satoshi et al.

(10) Patent No.: US 11,692,609 B2
(45) Date of Patent: Jul. 4, 2023

(54) DAMPING MEMBER AND ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Tanaka Satoshi, Inukami-gun (JP); Tajiri Yoji, Inukami-gun (JP); Yamagoshi Kenji, Inukami-gun (JP); Oiwa Kento, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 1052 days.

(21) Appl. No.: 16/466,985

(22) PCT Filed: Dec. 5, 2017

(86) PCT No.: PCT/JP2017/043697
§ 371 (c)(1),
(2) Date: Jun. 5, 2019

(87) PCT Pub. No.: WO2018/105623
PCT Pub. Date: Jun. 14, 2018

(65) Prior Publication Data
US 2019/0301560 A1 Oct. 3, 2019

(30) Foreign Application Priority Data
Dec. 6, 2016 (JP) .............................. JP2016-236751

(51) Int. Cl.
*F16F 15/08* (2006.01)
*F16F 1/377* (2006.01)
(Continued)

(52) U.S. Cl.
CPC .............. *F16F 15/08* (2013.01); *F16F 1/377* (2013.01); *F16F 15/04* (2013.01); *H01R 35/04* (2013.01);
(Continued)

(58) Field of Classification Search
CPC ............................ F16F 1/377; F16F 2224/025
See application file for complete search history.

(56) References Cited

U.S. PATENT DOCUMENTS 4,540,223 A * 9/1985 Schmerda .............. H02G 11/00
439/15
5,102,061 A * 4/1992 Suzuki ................... H01R 35/02
242/395
(Continued)

FOREIGN PATENT DOCUMENTS

CN 1122961 A 5/1996
CN 1877920 A 12/2006
(Continued)

OTHER PUBLICATIONS

International Search Report dated Feb. 6, 2018 in PCT/JP2017/043697 filed on Dec. 5, 2017.
(Continued)

*Primary Examiner* — Melody M Burch
(74) *Attorney, Agent, or Firm* — Oblon, McClelland, Maier & Neustadt, L.L.P.

(57) ABSTRACT

A damping member reduces noise between a rotary connector device and a vehicle body side, which are connected. An engaging portion is inserted through the damping member, and is provided in a rotary connector device. The engaging portion engages with an engaged portion provided in a vehicle body side, and includes an engaging shaft extending in an insertion direction and an engaging claw protruding from the tip side of the engaging shaft. The damping
(Continued)

member is formed of butyl rubber, and includes a first slit through which the engaging shaft is inserted and a second slit extending from the first slit toward the protruding direction side of the engaging claw. The first slit and the second slit communicate with each other, the engaging portion being inserted there through.

13 Claims, 17 Drawing Sheets

(51) Int. Cl.
*F16F 15/04* (2006.01)
*H01R 35/04* (2006.01)
*B60R 16/027* (2006.01)

(52) U.S. Cl.
CPC ....... *B60R 16/027* (2013.01); *F16F 2224/025* (2013.01)

(56) References Cited

U.S. PATENT DOCUMENTS

| | | | |
|---|---|---|---|
| 5,490,793 | A | 2/1996 | Bolen |
| 5,637,005 | A | 6/1997 | Bannai et al. |
| 6,019,621 | A | 2/2000 | Sugata et al. |
| 2008/0006515 | A1 | 1/2008 | Mitsui. et al. |
| 2009/0140476 | A1 | 6/2009 | Michiyama et al. |
| 2011/0193278 | A1 | 8/2011 | Kobori |
| 2011/0275238 | A1 | 11/2011 | Iijima et al. |

FOREIGN PATENT DOCUMENTS

| | | | | |
|---|---|---|---|---|
| CN | 101100177 | A | 1/2008 | |
| CN | 101446327 | A | 6/2009 | |
| CN | 202050072 | U | 11/2011 | |
| CN | 103825124 | A | 5/2014 | |
| CN | 204055981 | U | 12/2014 | |
| CN | 104373716 | A | 2/2015 | |
| CN | 204809457 | U | 11/2015 | |
| CN | 105375222 | A | 3/2016 | |
| DE | 102010009375 | A1 * | 8/2011 | ............... F16F 9/12 |
| EP | 0 848 460 | A1 | 6/1998 | |
| EP | 1 247 697 | A2 | 10/2002 | |
| EP | 1 876 066 | A1 | 1/2008 | |
| EP | 2 763 246 | A1 | 8/2014 | |
| GB | 2 276 219 | A | 9/1994 | |
| JP | 7-69538 | A | 3/1995 | |
| JP | 10-141437 | A | 5/1998 | |
| JP | 10-172707 | A | 6/1998 | |
| JP | 2001-1909 | A | 1/2001 | |
| JP | 2008-13012 | A | 1/2008 | |
| JP | 2010-270873 | A | 12/2010 | |
| JP | 2016-98861 | A | 5/2016 | |

OTHER PUBLICATIONS

Combined Chinese Office Action and Search Report dated Apr. 28, 2020 in Chinese Patent Application No. 201780075314.X (with English translation), 16 pages.

European Office Action dated Jun. 29, 2020 in European Patent Application No. 17879004.4, 4 pages.

* cited by examiner

[FIG. 1]
(a)
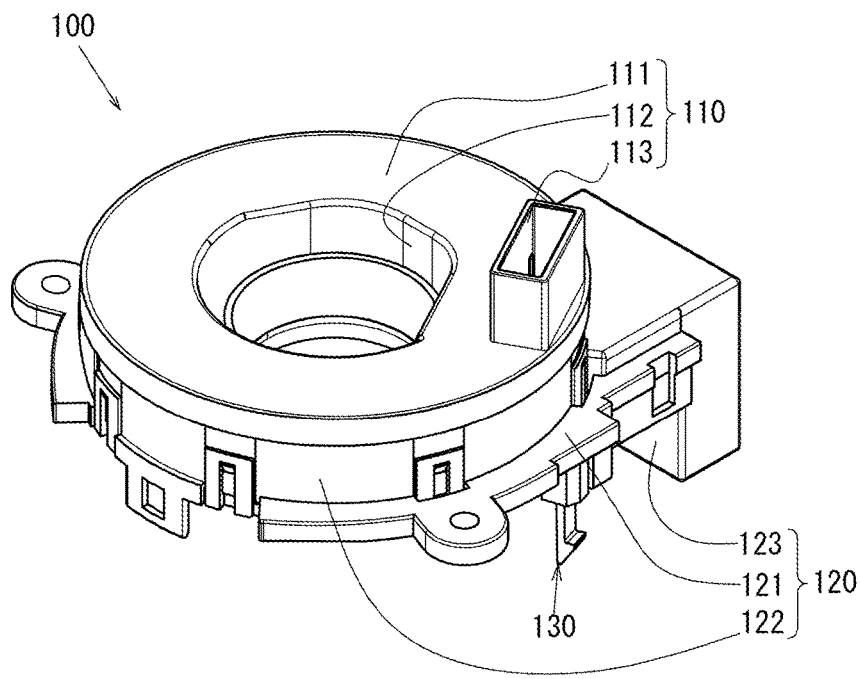
(b)
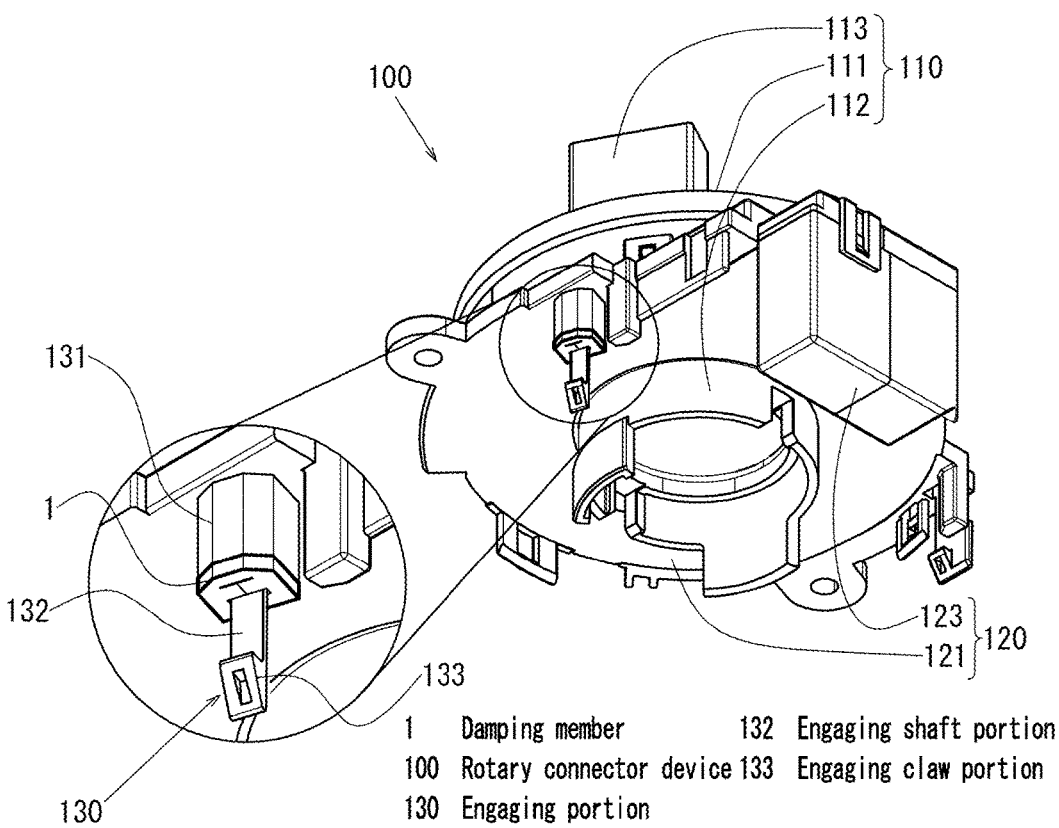
| | |
|---|---|
| 1 Damping member | 132 Engaging shaft portion |
| 100 Rotary connector device | 133 Engaging claw portion |
| 130 Engaging portion | |

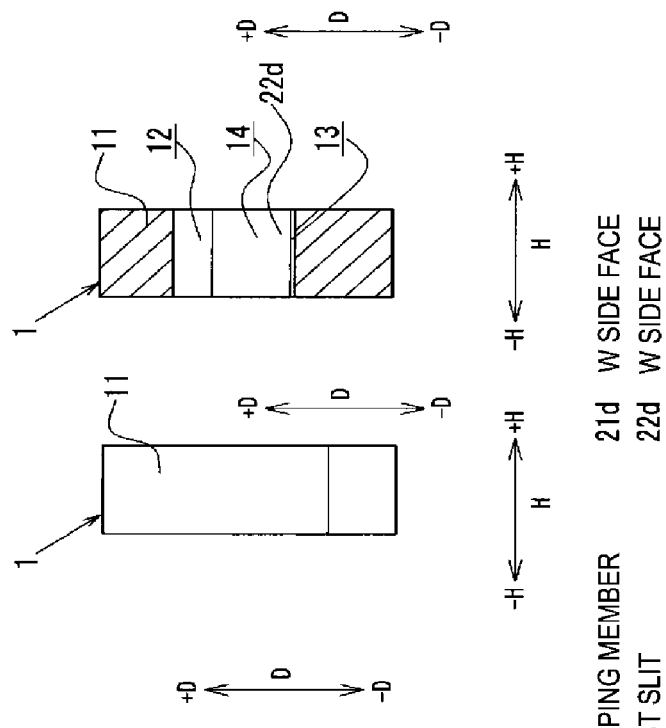
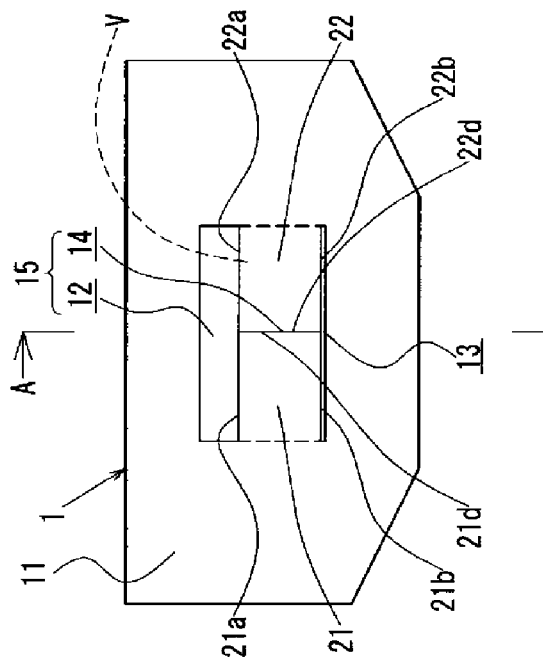

| | | | | | |
|---|---|---|---|---|---|
| 1 | DAMPING MEMBER | 14 | SECOND SLIT | 130 | ENGAGING PORTION |
| 12 | FIRST SLIT | 21 | FIRST CONVEX PORTION | 132 | ENGAGING SHAFT |
| 13 | THIRD SLIT | 22 | SECOND CONVEX PORTION | 133 | ENGAGING CLAW |

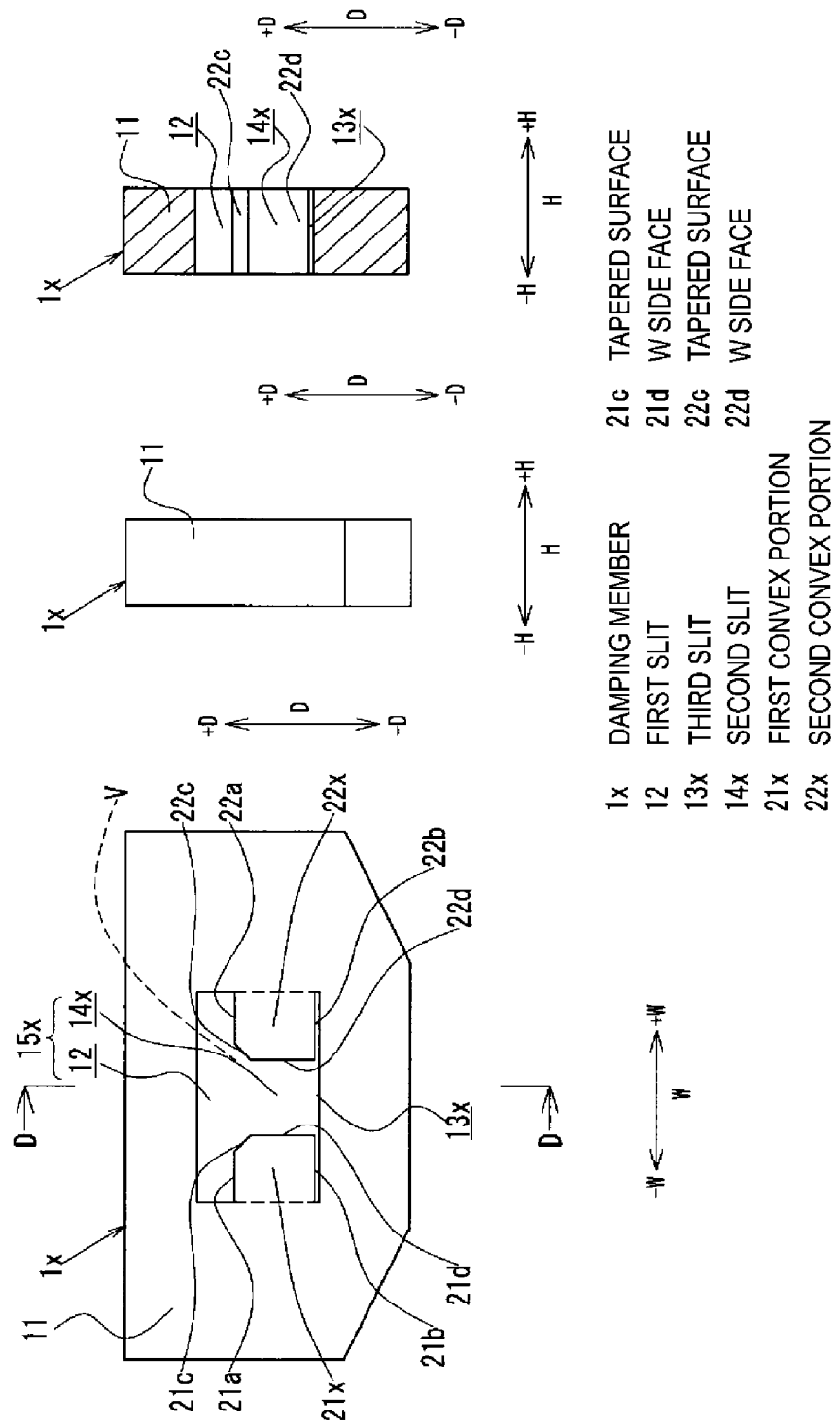

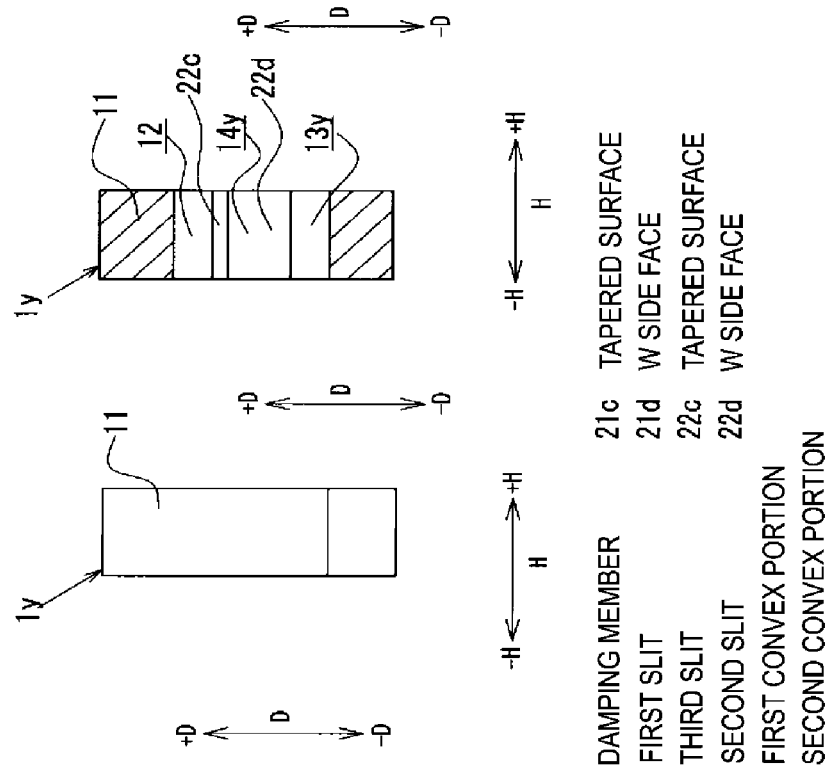
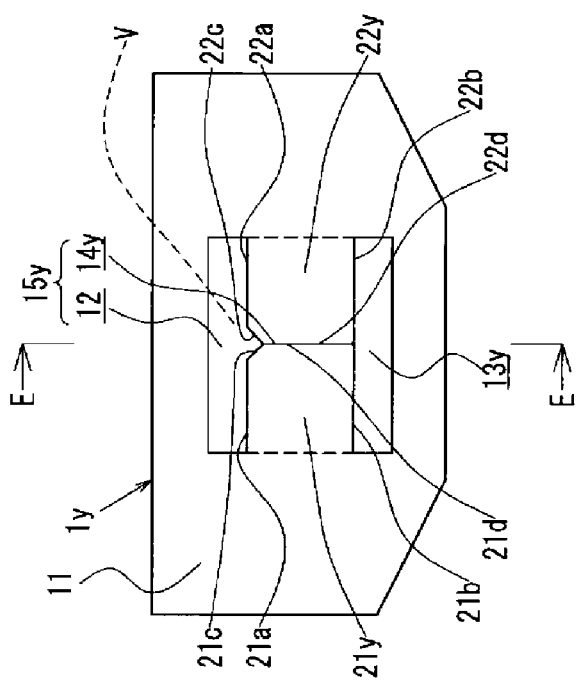

| | | | |
|---|---|---|---|
| 1 | DAMPING MEMBER | 22 | SECOND CONVEX PORTION |
| 12 | FIRST SLIT | 21c | TAPERED SURFACE |
| 13 | THIRD SLIT | 21d | W SIDE FACE |
| 14 | SECOND SLIT | 22c | TAPERED SURFACE |
| 21 | FIRST CONVEX PORTION | 22d | W SIDE FACE |

| 1 | DAMPING MEMBER | 14 | SECOND SLIT | 130 | ENGAGING PORTION |
| 12 | FIRST SLIT | 21 | FIRST CONVEX PORTION | 132 | ENGAGING SHAFT |
| 13 | THIRD SLIT | 22 | SECOND CONVEX PORTION | 133 | ENGAGING CLAW |

| 1, 1x | DAMPING MEMBER | 14, 14x | SECOND SLIT | 130 | ENGAGING PORTION |
| 12 | FIRST SLIT | 21, 21x | FIRST CONVEX PORTION | 132 | ENGAGING SHAFT |
| 13, 13x | THIRD SLIT | 22, 22x | SECOND CONVEX PORTION | 133 | ENGAGING CLAW |

| 1, 1y | DAMPING MEMBER | 14, 14y | SECOND SLIT | 130 | ENGAGING PORTION |
| 12 | FIRST SLIT | 21, 21y | FIRST CONVEX PORTION | 132 | ENGAGING SHAFT |
| 13, 13y | THIRD SLIT | 22, 22y | SECOND CONVEX PORTION | 133 | ENGAGING CLAW |

DAMPING MEMBER AND ROTARY CONNECTOR DEVICE

TECHNICAL FIELD

The disclosure relates to, for example, a damping member which is mounted on a rotary connector device fixed to a vehicle body, such as an automobile, and which is interposed between the vehicle body and the rotary connector device, and the disclosure also relates to the rotary connector device equipped with the damping member.

BACKGROUND ART

A rotary connector device mounted on a vehicle body of an automobile or the like is configured by assembling a rotating body and a fixed body so as to be rotatable relative to each other, and in an annular housing space formed between the rotating body and the fixed body, a flexible flat cable (hereinafter referred to as a flat cable) is accommodated so as to be wound and rewound in accordance with the rotation of the rotating body.

This rotary connector device is assembled to, for example, a combination switch provided on the vehicle body side, and can send an electrical signal, an optical signal, or the like between the rotating body and the fixed body via the flat cable. Therefore, for example, an air bag provided on a steering wheel assembled to the rotating body side can be electrically connected to the vehicle body side, so that the air bag can be activated.

Many fixing structures of the rotary connector device assembled to the vehicle body side (combination switch) in this way are disclosed. For example, Patent Document 1 discloses a fixing structure in which the rotary connector device is assembled to a combination switch securely and easily by interposing a bracket that can be temporarily fixed to the fixed body side of the rotary connector device.

However, since there is free play between the rotary connector device and the combination switch, abnormal noise may be generated by vibration. Particularly in large vehicles such as large trucks with a strong vibration, there has been concern over abnormal noise being generated compared to passenger vehicles or the like.

CITATION LIST

Patent Literature

Patent Document 1: JP 2008-13012 A

SUMMARY OF INVENTION

Technical Problem

In view of the above-described problems, an object of the disclosure is to provide a damping member capable of preventing the occurrence of abnormal noise generated between a rotary connector device and a vehicle body side, which are mounted together, and to provide a rotary connector device equipped with the damping member.

Solution to Problem

The disclosure relates to a damping member configured to allow an engaging portion to be inserted through the damping member, in which the engaging portion is provided in a rotary connector device and includes an engaging shaft portion which extends in a predetermined direction and an engaging claw portion which protrudes from the engaging shaft portion.

The damping member is formed of an elastic material and comprises: a first slit through which the engaging shaft portion is inserted; and a second slit extending from the first slit toward the protruding direction side of the engaging claw portion, and the first slit and the second slit communicate with each other to provide an insertion portion through which the engaging portion is inserted.

Further, the disclosure relates to a damping member configured to allow an engaging portion to be inserted through the damping member, in which the engaging portion is provided in a rotary connector device and includes an engaging shaft portion which extends in a predetermined direction and an engaging claw portion which protrudes from the engaging shaft portion.

The damping member is formed of an elastic material and comprises:

a first slit through which the engaging shaft portion is installed; and a second slit extending from the first slit toward the protruding direction side of the engaging claw portion, and the first slit and the second slit communicate with each other to provide an installation portion through which the engaging portion is installed.

Further, the disclosure relates to a rotary connector device comprising: an annular fixed body having a connector portion to which a connection connector of an external electrical device is connected; a rotating body fitted to the fixed body so as to be relatively rotatable to form an annular housing space between the fixed body and the rotating body; a flat cable having one end connected to the connector portion and including a wound portion accommodated in the housing space; and an engaging portion engaging with an engaged portion provided on a vehicle body side, the engaging portion being allowed to be inserted through the insertion portion of the damping member so that the rotary connector device is provided with the damping member.

The elastic material is a material that is elastically deformable to a predetermined extent and can be molded into a predetermined shape, and includes, for example, natural rubber, synthetic resin, or the like.

The above-mentioned protruding direction side of the engaging claw portion includes not only the case of the orthogonal direction side orthogonal to the width direction of the first slit, but also the case of the direction intersecting within a range of about ±30 degrees from the orthogonal direction. That is, the second slit includes not only a case where it is orthogonal to the first slit, but also a case where the second slit is inclined at a predetermined angle. In addition, the second slit includes an opened gap, a not-opened cut, and a partially opened cut.

Also, the second slit includes a case where the second slit extends from a central portion of the first slit toward the protruding direction side; and a case where the second slit extends from an end portion. That is, as long as the second slit extends from the first slit toward the protruding direction side, it may extend from any position.

Further, as long as the second slit extends toward the protruding direction side, it may extend further in the opposite direction. That is, the second slit includes a case where it forms a cross shape or the like with the first slit.

Still further, as long as the one end of the second slit is in communication with the first slit, either the configuration where the other end extends to an end portion on the protruding direction side of the damping member; or the configuration where the other end is disposed on a center side relative to the end portion on the protruding direction side may be admissible.

Further, the number of the second slits is not limited to one, and a plurality of second slits may be provided.

According to the disclosure, it is possible to prevent generation of abnormal noise occurring between the rotary connector device to which the damping member is mounted; and the vehicle body side.

Specifically, since the damping member is formed of an elastic member, the second slit is elongated outward in the width direction by pulling both ends in the width direction of the damping member, which forms an opening through which the engaging claw can be inserted. Thus, the engaging shaft portion and the engaging claw portion can be inserted through the first slit and the second slit.

In addition, when the engaging claw portion is inserted and the pulling force applied outward in the width direction is released, since the second slit can be prevented from interfering with the engaging claw portion to warp, the damping member can be appropriately disposed between the engaging portion and the engaged portion, which prevents generation of abnormal noise occurring between the rotary connector device and the vehicle body side due to the vibration of the vehicle body or the like.

In an aspect of the disclosure, the second slit may be provided between a pair of convex portions disposed to oppose each other from both sides in a forming direction of the first slit, with respect to the first slit.

According to the disclosure, the second slit is provided substantially in the center of the first slit so that the pulling force, acting outward in the width direction, for opening the second slit to enable the engaging claw to be inserted therethrough, can be substantially equal. As a result, the pair of convex portions (the first convex portion and the second convex portion) are pulled substantially evenly outward so that an opening for inserting the engaging claw can be formed in the central portion in the width direction. Therefore, at the time of insertion, the engaging claw portion can be prevented from being caught by one of the first convex portion or the second convex portion, so the engaging claw portion can be easily inserted.

Furthermore, since the pulling force acting on both ends can be made substantially equal, it is possible to prevent a load from being biased to one side in the width direction.

Further, as an aspect of the disclosure, opposing surfaces of the pair of the convex portions may be disposed with a predetermined distance therebetween.

According to the disclosure, even if a weak pulling force acts outward at both end sides in the width direction, since the second slit formed by the pair of the convex portions can be opened so that the engaging claw can be inserted therethrough, the engaging claw portion can be inserted through the second slit reliably and easily. Further, since the pulling force can be weakened, the load applied to the damping member can be reduced due to the second slit being opened so that the engaging claw can be inserted therethrough.

Further, as an aspect of the disclosure, the opposing surfaces of the pair of the convex portions may be in contact with each other.

According to the disclosure, even when the pulling force applied to the both sides in the width direction is released after the engaging claw portion is inserted, the pair of the convex portions forming a part of the first slit can surround a part of the engaging shaft portion. That is, the contact area between the pair of convex portions and the engaging shaft portion can be increased, thus preventing the damping member from rotating around the engaging shaft portion.

Further, as an aspect of the disclosure, a tapered surface is provided on an opposing side of the pair of convex portions and on the side of the first slit.

According to the disclosure, in the case where a pulling force is applied to both end sides in the width direction and the engaging claw portion and the engaging shaft portion are inserted through the first slit and the second slit, the space formed in the central portion by the first slit and the second slit can be enlarged, so the contact area between the engaging shaft portion and the engaging claw portion; and the first convex portion and the second convex portion can be reduced. Therefore, it is possible to prevent the first convex portion and the second convex portion from interfering with the engaging shaft portion and the engaging claw portion or the like to warp.

Further, by forming the intersecting portion of the first convex portion and the second convex portion with the first slit to have a tapered shape inclined inward, the disposing direction of the damping member can be easily determined using the tapered shape as a marker.

Further, as an aspect of the disclosure, a third slit formed in the same direction as the first slit and being in communication with the second slit may be provided on a side opposite to the first slit.

The above "being in communication with the second slit" includes, for example, not only a case when the third slit is provided at the tip end of the second slit in the protruding direction, that is, at the end opposite to the first slit side, but also a case when the third slit is provided in the central portion of the second slit.

According to the disclosure, the engaging shaft portion can be inserted through the first slit more reliably.

Specifically, in the damping member in which the third slit is not provided, when a pulling force which pulls both ends in the width direction of the damping member outward is applied, the pair of the convex portions (the first convex portion and the second convex portion) are drawn toward the first slit side. As a result, the space along the protruding direction of the first slit becomes narrower, so when the engaging shaft is inserted through the first slit, the first convex portion and the second convex portion easily interfere with the engaging shaft.

However, by providing the third slit on a side opposite to the first slit, the third slit being formed in the same direction as the first slit and being in communication with the second slit, even if a pulling force is applied to both ends of the damping member, the first convex portion and the second convex portion can be prevented from being drawn to the first slit side. That is, the damping member can be stretched in the width direction while maintaining the shape of the first slit, and the first convex portion and the second convex portion are prevented from interfering with the engaging shaft portion, which allows the engaging shaft portion to be reliably inserted through the first slit.

In addition, in a case where a pulling force is applied, since the shape of the first slit can be maintained, when the pulling force is released and the first convex portion and the second convex portion thus return to their original positions, the possibility that the first slit sides of the first convex portion or the second convex portion interfere with the inserted engaging claw portion or engaging shaft portion to warp can be reduced.

Further, as an aspect of the disclosure, the third slit may have the same shape as the first slit.

According to the disclosure, even when a pulling force is applied to both ends of the damping member in the width direction, the first convex portion and the second convex portion are pulled along the width direction, which can prevent more reliably the pair of the convex portions (the first convex portion and the second convex portion) from being drawn toward the first slit side. Therefore, the engaging shaft can be more reliably inserted through the first slit, and even after the pulling force is released, the first convex portion and the second convex portion can be prevented from interfering with the engaging shaft portion to warp.

Advantageous Effects of Invention

The disclosure can provide a damping member capable of preventing the occurrence of abnormal noise generated between a rotary connector device and a vehicle body side, which are assembled together, and can provide a rotary connector device equipped with the damping member.

BRIEF DESCRIPTION OF DRAWINGS

FIG. 1 is a schematic perspective view of a rotary connector device.
FIG. 2 is an explanatory diagram of a damping member.
FIG. 4 is an explanatory diagram of a damping member according to a second embodiment.
FIG. 5 is an explanatory diagram of a damping member according to a third embodiment.

Figure 3A:
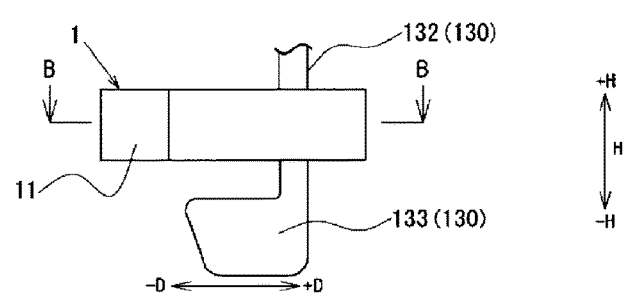
FIG. 3 is an explanatory diagram of a damping member mounted to an engaging portion.

First, with reference to FIG. 1, a description will be given of a rotary connector device 100 which is equipped with a damping member 1.

FIG. 1 is a schematic perspective view of the rotary connector device 100. Specifically, FIG. 1A is a schematic perspective view of the rotary connector device 100 as viewed from above, and FIG. 1B is a schematic perspective view of the rotary connector device 100 as viewed from below.

As illustrated in FIG. 1, the rotary connector device 100 includes a rotator 110 which allows a steering wheel (not illustrated) to be inserted and fixed, a stator 120 which is fixed to a combination switch (not illustrated) disposed below and rotatable relative to the rotator 110, and a flexible flat cable (hereinafter referred to as FFC, and not illustrated) wound around an annular housing space formed inside by the rotator 110 and the stator 120.

The rotator 110 integrally includes a substantially annular rotating side ring plate 111 having a substantially circular through-hole in the central portion in a plan view, and an inner circumferential cylindrical portion 112 formed downward from the inner-circumferential edge of the rotating side ring plate 111. On the upper surface of the rotating side ring plate 111, there is provided a rotator side connector housing portion 113 which protrudes upward and functions as a connector.

Further, the rotator side connector housing portion 113 is formed so as to be connected internally to one end of the FFC disposed in the housing space, and so as to be externally connectable to a connector connected to an end portion of an electric circuit, such as a horn on the steering wheel side or an air bag system.

The stator 120 rotatable relative to the rotator 110 integrally includes a stator side ring member 121 formed in a substantially annular shape having a circular hole in the center and constituting the bottom surface of the rotary connector device 100; and an outer circumferential member 122 formed into a cylindrical shape which opens along the rotating shaft and which forms a cylindrical outer circumferential surface of the rotary connector device 100. Further, the outer circumferential member 122 is provided with a stator side connector connecting portion 123 which protrudes outward in the radial direction so as to protrude downward from the stator side ring member 121.

The stator side connector connecting portion 123 is formed so as to be connected to the other end of the FFC disposed in the housing space and so as to be externally connectable to an external connector provided on a cable wired from a combination switch side (not illustrated).

In addition, an engaging portion 130, which fixes the rotary connector device 100 to the combination switch, is provided on the back surface of the stator side ring member 121.

As illustrated in the enlarged view of FIG. 1B, the engaging portion 130 includes an engaging base 131 provided on the back surface of the stator side ring member 121, an engagement shaft 132 of a prism body protruding downward from the engaging base 131, and an engaging claw 133 protruding radially outward from the tip end of the engaging shaft 132.

The engaging base 131 is a hexagonal prism having a hexagonal shape as a bottom surface formed by cutting off two corners, disposed on the radially outer side, out of the four corners of a rectangle and protrudes downward from the back surface of the stator side ring member 121.

The engaging shaft 132 is a flat plate having flexibility and extending downward from the central portion of the engaging base 131 and is equipped with a damping member 1 inserted therethrough. Further, the plate thickness of the engaging shaft 132 is sufficiently shorter than the length of the shorter side of the engaging base 131.

The engaging claw 133 is an engaging piece which protrudes radially outward from the bottom end portion of the engaging shaft 132, which is tapered downward, and which has a substantially triangular shape in a side view. The width is equal to that of the engaging shaft 132, and the depth is about two-thirds of the depth of the engaging base 131.

First Embodiment

Next, the damping member 1 to be mounted to the engaging portion 130 will be described with reference to FIGS. 2 and 3.

FIG. 2 is an explanatory view of the configuration of the damping member 1. In detail, FIG. 2A is a plan view of the damping member 1, FIG. 2B is a side view of the damping member 1, and FIG. 2C shows a cross sectional view taken along the arrow A-A in FIG. 2A. Here, in FIG. 2A, the longitudinal direction of the damping member 1 is defined as the width direction W, and the transverse direction is defined as the depth direction D. In FIG. 2A, the left side is defined as the −W side, the right side is defined as the +W side, the upper side is defined as the +D side, and the lower side is defined as the −D side. Further, in FIG. 2B, the vertical direction is defined as the height direction H, the upper side is defined as the +H side, and the lower side is defined as the −H side.

Figure 3B:
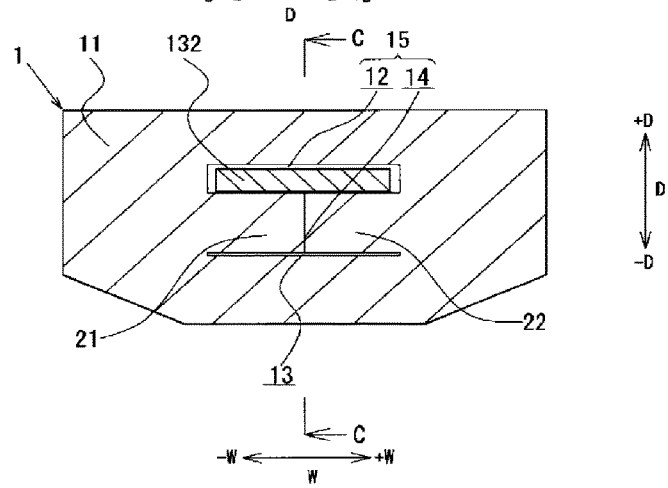
Figure 3C:
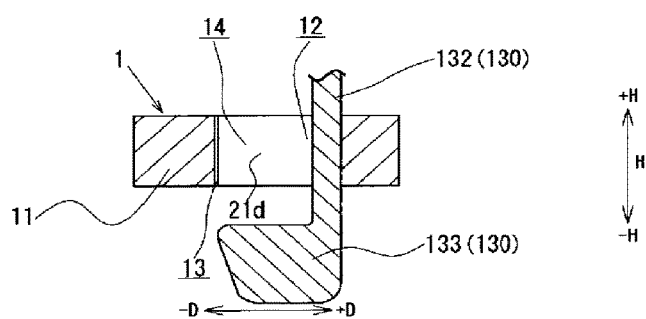

FIG. 3 is an explanatory view of the damping member 1 mounted to the engaging portion 130. In detail, FIG. 3A is a side view of the damping member 1 through which the engaging portion 130 is inserted, FIG. 3B is a cross sectional view taken along the arrow B-B in FIG. 3A, and FIG. 3C is a cross sectional view taken along the arrow C-C in FIG. 3B.

As illustrated in FIGS. 2A and 2B, the damping member 1 includes a flat damping member main body portion 11 having a predetermined thickness, a first slit 12 provided on the +D side of a central portion in the width direction W of the damping member main body portion 11, a third slit 13 provided on the −D side of the central portion in the width direction W of the damping member main body portion 11, and a second slit 14 formed along the depth direction D in the central portion of the damping member main body portion 11.

The damping member main body portion 11 is made of an elastically deformable butyl rubber and formed substantially in the same shape as the bottom surface of the engaging base 131. In other words, the damping member main body portion 11 is a substantially hexagonal plate made of butyl rubber, which is formed by cutting off two corners located on the −D side of a rectangular shape in a plan view.

Note that the damping member main body portion 11 need not necessarily be made of butyl rubber as long as it is an elastically deformable elastic material and may be made of other synthetic rubber or natural rubber, for example. Further, the planar shape of the damping member main body portion 11 is formed to be substantially the same shape as the bottom surface of the engaging base 131, but the shape can be appropriately changed.

The first slit 12 has a rectangular shape with a long side along the width direction W and is a through-hole penetrating in the plate thickness direction of the damping member main body portion 11. Specifically, the first slit 12 is formed such that the length thereof in the width direction W is a size longer than the width of the engaging shaft 132, and the length in the depth direction D thereof is substantially the same as the depth of the engaging shaft 132.

As illustrated in FIG. 2A, the third slit 13 is a cut-shaped through-hole, which is juxtaposed with the first slit 12 and provided at a predetermined distance from the first slit 12 along the depth direction D, and the length of the third slit 13 in the width direction W is formed to be substantially the same as the length of the first slit 12.

The second slit 14 is a cut-shaped through-hole formed along the depth direction D in the central portion of the damping member main body portion 11, and the +D side end portion is connected to the first slit 12, and the −D side end portion is connected to the third slit 13.

In addition, the length of the second slit 14 is configured to be substantially equal to the length of the engaging claw 133 in the protruding direction.

In other words, in the configuration of the second slit 14, the second slit 14 is formed of a first convex portion 21 which protrudes from the −W side end portion of a virtual through-hole V (through-hole including the first slit 12 and the third slit 13), provided in the central portion of the damping member main body portion 11, toward the +W side, and a second convex portion 22 which protrudes from the +W side end portion toward the −W side.

The first convex portion 21 is a quadrangular convex portion, which has a base end (−W side end) connected to the damping member main body portion 11 and which protrudes from the base end toward the +W side, and a +D side face 21*a* located on the +D side and a −D side face 21*b* located on the −D side form the first slit 12 and the third slit 13 together with the end surfaces of the virtual through-hole V opposing them.

Similarly, the second convex portion 22 is a quadrangular convex portion, which has a base end (+W side end) connected to the damping member main body portion 11 and which protrudes from the base end toward the −W side, and a +D side face 22*a* located on the +D side and a −D side face 22*b* located on the −D side form the first slit 12 and the third slit 13 together with the end surfaces of the virtual through-hole V opposing them.

The first convex portion 21 and the second convex portion 22 which are configured as described above are disposed in a linearly symmetrical manner with respect to the center line of the damping member main body portion 11 in the width direction W as a symmetry axis, and the opposing surfaces (a W side face 21*d* and a W side face 22*d*) of the first convex portion 21 and the second convex portion 22 abut on each other in the center of the damping member main body portion 11 in the width direction W, thus forming the second slit 14 which is a cut-shaped through-hole.

The first slit 12 and the second slit 14 configured as described above constitute an insertion portion 15 through which the engaging portion 130 is inserted.

Next, with reference to FIG. 3, the damping member 1 mounted to the engaging portion 130 will be described.

As illustrated in FIGS. 3A and 3B, for the damping member 1 mounted to the engaging portion 130, the engaging shaft 132 is inserted through the first slit 12 along the plate thickness direction of the damping member 1. As described above, since the length of the first slit 12 in the depth direction D in a plan view is substantially the same as the length of the engaging shaft 132 in the depth direction D, the engaging shaft 132 abuts on the +D side face 21*a* and the +D side face 22*a* (See FIG. 3B and FIG. 3C).

Further, since the second slit 14 formed by the W side face 21*d* and the W side face 22*d* abutting on each other is formed to be narrower than the width of the engaging claw 133, even if the damping member 1 moves downward along the engaging shaft 132, the engaging claw 133 abuts on the first convex portion 21 and the second convex portion 22, therefore cannot be inserted through (detached from) the damping member 1 (see FIG. 3C). In this manner, the damping member 1 does not easily detached from the engaging portion 130.

Second Embodiment

The configuration of a damping member 1*x* which is another embodiment of the damping member 1 will be described with reference to FIG. 4.

However, in the configuration of the damping member 1x described below, the same components as those of the damping member 1 in the above-described first embodiment are denoted by the same reference numerals, and description thereof is omitted.

In detail, FIG. 4 is an explanatory view for explaining the configuration of the damping member 1x, and FIG. 4A is a plan view of the damping member 1x, FIG. 4B is a side view of the damping member 1x, and FIG. 4C is a cross sectional view taken along the arrow D-D in FIG. 4A.

As illustrated in FIG. 4, the damping member 1x includes the flat damping member main body portion 11, the first slit 12 provided on the +D side of the damping member main body portion 11, a third slit 13x provided on the −D side of the damping member main body portion 11, and a second slit 14x formed along the depth direction D in the central portion of the damping member main body portion 11.

The third slit 13x is a cut-shaped through-hole, which is juxtaposed with the first slit 12 and is provided at a predetermined distance from the first slit 12 along the depth direction D, and the length of the third slit 13x in the width direction W is formed to be substantially the same as the length of the first slit 12.

The second slit 14x is a through-hole formed along the depth direction D in the central portion of the damping member main body portion 11, and the +D side end portion is connected to the first slit 12, and the −D side end portion is connected to the third slit 13x.

The length of the second slit 14x is configured to be substantially equal to the length of the engaging claw 133 in the protruding direction, similarly to the second slit 14.

In other words, in the configuration of the second slit 14x, the second slit 14x includes a first convex portion 21x which protrudes from the −W side end portion toward the +W side of the virtual through-hole V (through-hole including the first slit 12 and the third slit 13x), provided in the central portion of the damping member main body portion 11, and a second convex portion 22x which protrudes from the +W side end portion toward the −W side.

The first convex portion 21x is a substantially pentagonal convex portion, which has a base end (−W side end) connected to the damping member main body portion 11 and which protrudes from the base end toward the +W side. The +D side face 21a located on the +D side and the −D side face 21b located on the −D side forms the first slit 12 and the third slit 13x together with the end surfaces of the virtual through-hole V. Additionally, a tapered surface (tapered surface 21c), which slopes toward the −D side as it goes toward +W side, is formed on the +D side of the tip end (+W side end portion) of the first convex portion 21x.

That is, the first convex portion 21x is a pentagonal convex portion which has a base end portion integrally formed with the damping member main body portion 11 and which protrudes toward the +W side with respect to the virtual through-hole V formed in the center of the damping member main body portion 11, and the first slit 12 and the third slit 13x are formed respectively on the +D side and the −D side of the first convex portion 21x.

Similarly, the second convex portion 22x is a substantially pentagonal convex portion, which has a base end portion (+W side end portion) connected to the damping member main body portion 11 and which protrudes from the base end toward the −W side. The +D side face 22a located on the +D side and the −D side face 22b located on the −D side respectively forms the first slit 12 and the third slit 13x together with the end surfaces of the virtual through-hole V. Additionally, a tapered surface (tapered surface 22c), which slopes toward the −D side as it goes toward the −W side, is formed on the +D side of the tip end (−W side end portion) of the second convex portion 22x.

That is, the second convex portion 22x is a pentagonal convex portion which has a base end portion integrally formed with the damping member main body portion 11 and which protrudes toward the −W side with respect to the virtual through-hole V formed in the center of the damping member main body portion 11, and the first slit 12 and the third slit 13x are formed respectively on the +D side and the −D side of the second convex portion 22x.

The first convex portion 21x and the second convex portion 22x which are configured as described above are disposed in a linearly symmetrical manner with respect to the center line, as a symmetry axis, of the damping member main body portion 11 in the width direction W, and the opposing surfaces (the W side face 21d and the W side face 22d) of the first convex portion 21x and the second convex portion 22x are spaced apart from each other by a predetermined distance. That is, the second slit 14x opened in the plate thickness direction (height direction H) is formed between the opposing surfaces of the first convex portion 21x and the second convex portion 22x.

As described above, unlike the damping member 1, the damping member 1x has the tapered surface 21c and the tapered surface 22c formed in the first convex portion 21x and the second convex portion 22x, and the damping member 1x has the second slit 14x which is formed by the W side face 21d and the W side face 22d separated by a predetermined distance.

Further, the first slit 12 and the second slit 14x configured as described above constitute an insertion portion 15x through which the engaging portion 130 is inserted.

Third Embodiment

Similarly, the configuration of a damping member 1y according to the third embodiment of the disclosure will be described with reference to FIG. 5.

However, in the configuration of the damping member 1y described below, the same components as those of the damping member 1 and the damping member 1x in the above-described first embodiment are denoted by the same reference numerals, and description thereof is omitted.

FIG. 5 is an explanatory view for explaining the configuration of the damping member 1y, and specifically, FIG. 5A is a plan view of the damping member 1y, FIG. 5B is a side view of the damping member 1y, and FIG. 5C is a cross sectional view taken along the arrow E-E in FIG. 5A.

As illustrated in FIG. 5, the damping member 1y includes the flat damping member main body portion 11, the first slit 12 provided on the +D side of the damping member main body portion 11, a third slit 13y provided on the −D side of the damping member main body portion 11, and a second slit 14y formed along the depth direction D in the central portion of the damping member main body portion 11.

As illustrated in FIG. 5A, the third slit 13y is a through-hole having the same shape as the first slit 12 and provided at a predetermined distance from the first slit 12 along the depth direction D (−D side) of the first slit 12.

The second slit 14y is a through-hole formed along the depth direction D in the central portion of the damping member main body portion 11, and the +D side end portion is connected to the first slit 12, and the −D side end portion is connected to the third slit 13y.

Further, the length of the second slit 14y is configured to be substantially equal to the length of the engaging claw 133 in the protruding direction, similarly to the second slit 14.

In other words, in the configuration of the second slit 14y, the second slit 14y includes a first convex portion 21y which protrudes from the −W side end portion toward the +W side of the virtual through-hole V (through-hole including the first slit 12 and the third slit 13y), provided in the central portion of the damping member main body portion 11, and a second convex portion 22y which protrudes from the +W side end portion toward the −W side.

The first convex portion 21y is a substantially pentagonal convex portion, which has a base end portion (−W side end portion) connected to the damping member main body portion 11 and which protrudes from the base end toward the +W side. The +D side face 21a located on the +D side and the −D side face 21b located on the −D side respectively forms the first slit 12 and the third slit 13y together with the end surfaces of the virtual through-hole V. Additionally, the tapered surface (tapered surface 21c), which slopes toward the −D side as it goes toward +W side, is formed on the +D side of the tip end (+W side end portion) of the first convex portion 21y.

That is, the first convex portion 21y is a pentagonal convex portion which has a base end portion integrally formed with the damping member main body portion 11 and which protrudes toward the +W side with respect to the virtual through-hole V formed in the center of the damping member main body portion 11, and the first slit 12 and the third slit 13y are formed respectively on the +D side and the −D side of the first convex portion 21y.

Similarly, the second convex portion 22y is a substantially quadrangular convex portion which has a base end portion (−W side end portion) connected to the damping member main body portion 11 and which protrudes from the base end toward the −W side. The +D side face 22a located on the +D side and the −D side face 22b located on the −D side respectively forms the first slit 12 and the third slit 13y together with the end surfaces of the virtual through-hole V. Additionally, the tapered surface (tapered surface 22c), which slopes toward the −D side as it goes toward the −W side, is formed on the +D side of the tip end (−W side end portion) of the second convex portion 22y.

That is, the second convex portion 22y is a pentagonal convex portion which has a base end portion integrally formed with the damping member main body portion 11 and which protrudes toward the +W side with respect to the virtual through-hole V formed in the center of the damping member main body portion 11, and the first slit 12 and the third slit 13y are formed respectively on the +D side and the −D side of the second convex portion 22y.

The first convex portion 21y and the second convex portion 22y which are configured as described above are disposed in a linearly symmetrical manner with respect to the center line, as a symmetry axis, of the damping member main body portion 11 in the width direction W, and the opposing surfaces (the W side face 21d and the W side face 22d) of the first convex portion 21y and the second convex portion 22y abut on each other to form the cut-shaped second slit 14y.

As described above, in the damping member 1y, unlike the damping member 1, the third slit 13y is formed in the same shape as the first slit 12, and the tapered surface 21c and the tapered surface 22c are formed in the first convex portion 21y and the second convex portion 22y respectively.

Further, the first slit 12 and the second slit 14y configured as described above constitute an insertion portion 15y through which the engaging portion 130 is inserted.

The damping member 1 (the damping member 1x and the damping member 1y) thus configured can be mounted to the engaging portion 130 as described above. Hereinafter, the configuration of an insertion jig 30, which is a jig for mounting the engaging portion 130 to the damping member 1, and the mounting method for mounting the damping member 1 to the engaging portion 130, will be described with reference to FIGS. 6 to 8.

First, the configuration of the insertion jig 30 for inserting the engaging portion 130 through the damping member 1 will be described with reference to FIG. 6.

Figure 6:
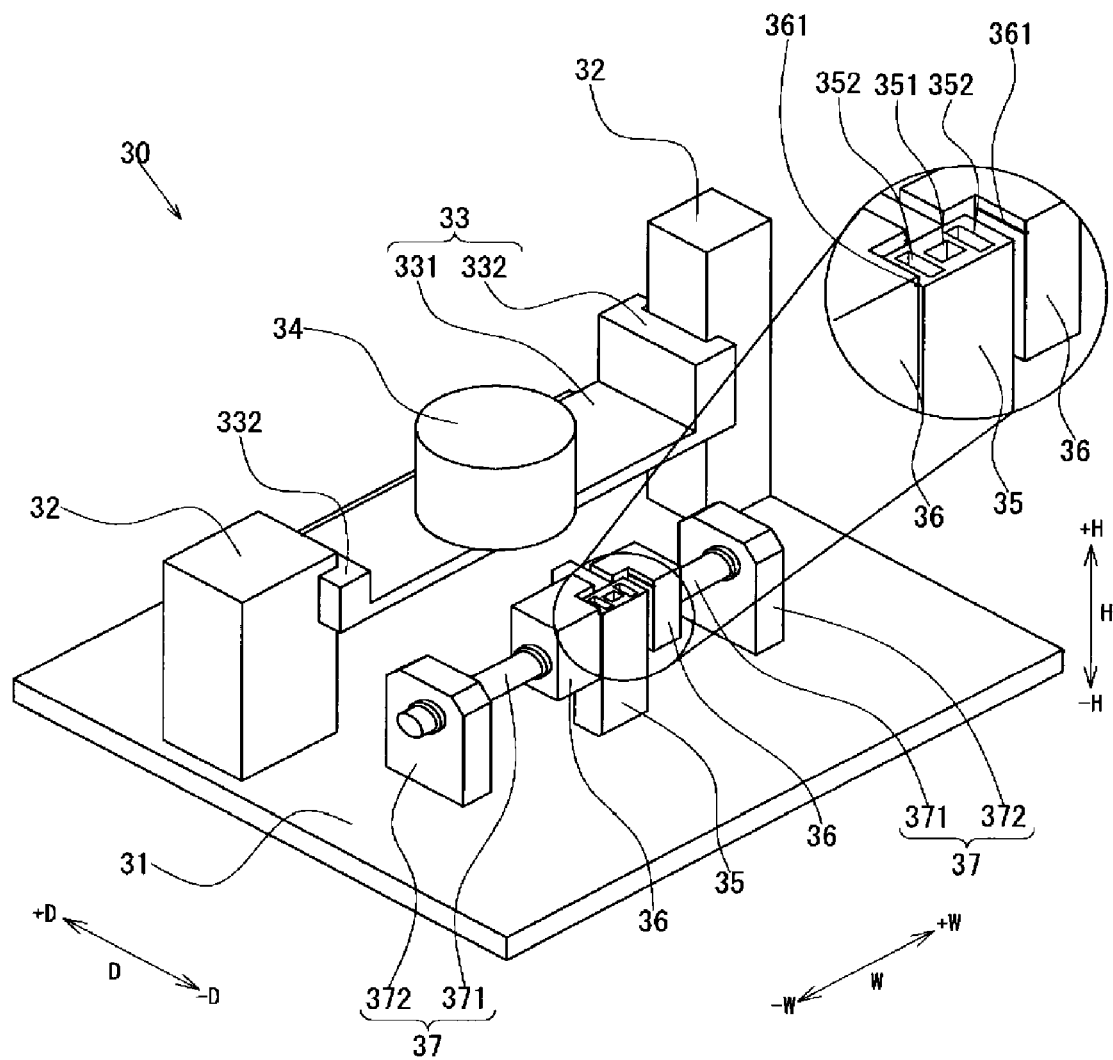
FIG. 6 is a schematic perspective view of an insertion jig.

FIG. 6 is a schematic perspective view of the insertion jig 30 for mounting the damping member 1 to the rotary connector device 100. Further, in FIG. 6, the direction from the left front to the right back is defined as the width direction W, and the direction from the right front to the left back is defined as the depth direction D, and the vertical direction is defined as the height direction H. Also, in FIG. 6, the left front side is defined as the −W side, the right back side as the +W side, the right front side as the −D side, the left back side as the +D side, and the upper side as the +H side and the lower side as the −H side.

The insertion jig 30 includes: a pedestal 31; a pair of lifting and lowering operation units 32 which are erected with a predetermined distance from each other along the width direction W on the +D side of the pedestal 31; a lifting and lowering plate 33 which couples the lifting and lowering operation units 32 to each other; a rotary connector device fitting portion 34, for disposing the rotary connector device 100, provided on the lifting and lowering plate 33; a damping member main body disposing unit 35 provided on the −D side of the rotary connector device fitting portion 34; damping member holding units 36 which holds both ends in the width direction of the damping member 1 disposed in the damping member main body disposing unit 35; and side movement units 37 provided at both ends in the width direction of the damping member main body disposing unit 35.

The pedestal 31 is a plate-like body which serves as a pedestal for disposing the lifting and lowering operation unit 32, the damping member holding unit 36, or the like.

The lifting and lowering operation units 32 erected on the pedestal 31 are disposed with a predetermined distance from each other along the width direction W, and a motor (not illustrated) is provided therein respectively, which can move a lifting and lowering plate 33 described later vertically along the height direction H.

The lifting and lowering plate 33 is integrally configured to include a plate-like lifting and lowering plate portion 331 for coupling the lifting and lowering operation units 32 to each other; and lifting and lowering portions 332, provided at both end portions of the lifting and lowering plate portion 331, which can move vertically relative to the lifting and lowering operation units 32.

The rotary connector device fitting portion 34 is a pillar with a substantially circular bottom surface, erected in the central portion of the lifting and lowering plate portion 331. The bottom surface of the rotary connector device fitting portion 34 is configured to be engageable with a substantially circular through-hole provided in the central portion in a plan view of the stator 120, and the stator 120 is fitted to the rotary connector device fitting portion 34 so that the rotary connector device 100 may vertically move along the height direction H.

Further, the lifting and lowering plate 33 is provided with an adjustment jig (not illustrated) which univocally adjusts the deposing position and direction of the rotary connector device 100.

The damping member main body disposing unit 35 is a pillar body, provided in the central portion of the pedestal 31, having a rectangular bottom surface, with a short side of substantially the same length as that of the damping member main body portion 11 and with a long side a size shorter than that of the damping member main body portion 11. A concave portion 351, which has a size and a depth through which the engaging claw 133 can be inserted, is provided in the central portion, and vacuum holes 352 are provided on both sides in the width direction of the concave portion 351.

The vacuum holes 352 are connected to a vacuum generating device (not illustrated) so that the inside of the damping member main body disposing unit 35 can be depressurized. That is, by disposing the damping member 1 on the upper surface of the damping member main body disposing unit 35 and activating the vacuum device, the damping member 1 can be held in the damping member main body disposing unit 35.

Each of the damping member holding units 36 provided at both ends of the damping member main body disposing unit 35 in the width direction is a housing with a grip portion 361, which has substantially the same thickness as that of the damping member 1, on the side of the damping member main body disposing unit 35. The grip portion 361 is formed so as to be able to grip the end portions at a predetermined position in the width direction W of the damping member 1 held by the damping member main body disposing unit 35.

Further, the grip portion 361 may be provided integrally with or separately from the damping member holding unit 36.

The side movement unit 37 is a moving mechanism which moves the damping member holding unit 36 along the width direction W and includes a cylindrical moving shaft 371 extending along the width direction W, the one end of which is connected to the damping member holding unit 36, and a moving shaft support portion 372 which supports the moving shaft 371 so as to be movable along the width direction W. By activating a motor (not illustrated) inside the moving shaft support portion 372, the moving shaft 371 may be moved along the width direction W. That is, the side movement unit 37 is a width direction movement mechanism for moving the damping member holding unit 36, along the width direction W, which grips the damping member 1 disposed in the damping member main body disposing unit 35.

Next, a method of inserting the engaging portion 130 into the damping member 1 using the insertion jig 30 with such a configuration will be described with reference to FIGS. 7 and 8.

In addition, FIG. 7 is an explanatory diagram of the damping member 1 before and after being stretched in the width direction W. FIG. 8 is an explanatory diagram of the damping member 1 through which the engaging portion 130 is inserted when the damping member 1 is stretched in the width direction W and the stretching is released.

Figure 7A:
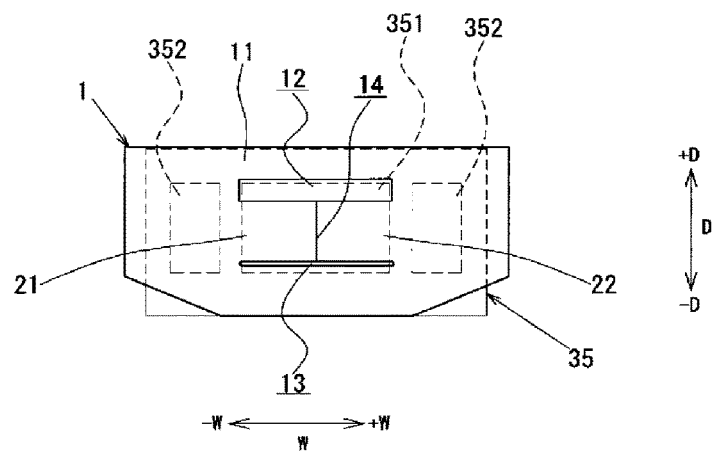
FIG. 7 is an explanatory view of a damping member before and after being stretched in the width direction.
Figure 7B:
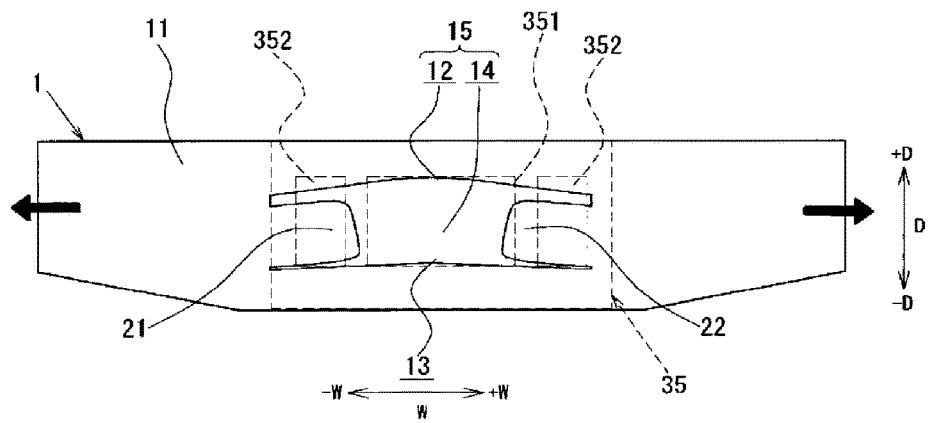

Specifically, FIG. 7A is a plan view of the damping member 1 before stretching the damping member 1 disposed in the damping member main body disposing unit 35, and FIG. 7B is a plan view of the damping member 1 after stretching. In addition, in FIGS. 7A and 7B, the position of the damping member main body disposing unit 35 is indicated by a dotted line for illustration.

Figure 8A:
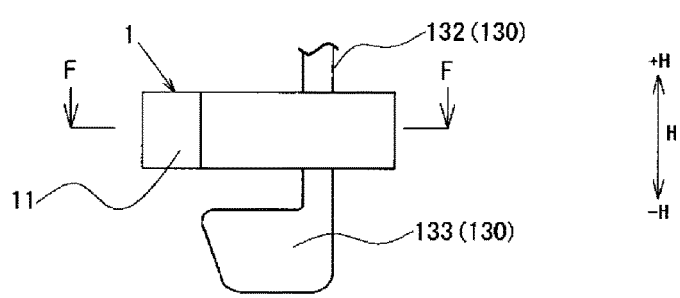
FIG. 8 is an explanatory view of a damping member through which an engaging portion is inserted.
Figure 8B:
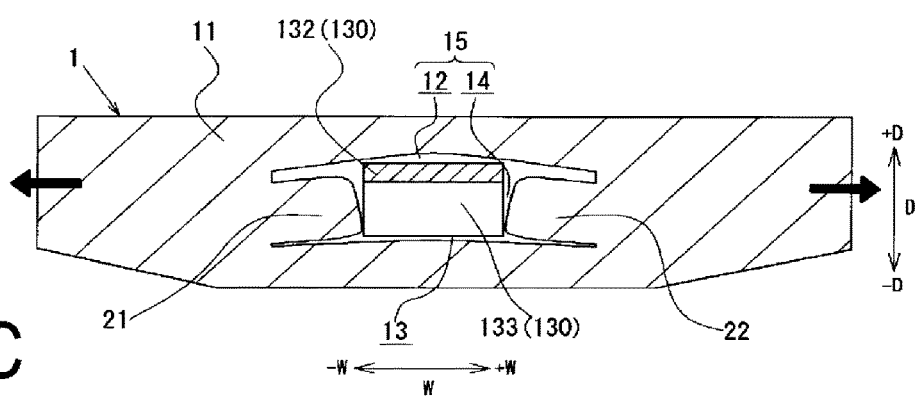
Figure 8C:
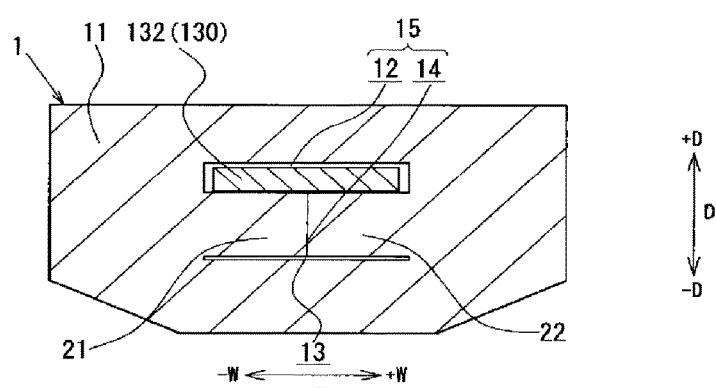

FIG. 8A is a side view of the damping member 1 through which the engaging portion 130 is inserted in a stretched state, and FIG. 8B is a cross sectional view taken along the arrow F-F illustrated in FIG. 8A, and FIG. 8C is a cross sectional view taken along the arrow F-F of the damping member 1 through which the engaging portion 130 is inserted in a state where the stretching is released.

First, the damping member 1 is disposed in the damping member main body disposing unit 35 so that the notched portion of the damping member 1 is on the −D side, and the vacuum generating device connected to the vacuum holes 352 is activated. As a result, the vacuum hole 352 is depressurized so that the damping member main body disposing unit 35 can hold the damping member 1 (see FIG. 7A).

Next, the rotary connector device fitting portion 34, which is provided in the central portion of the lifting and lowering plate 33, and the through-hole, which is provided in the central portion in a plan view of the stator 120, are fitted such that the engaging portion 130 is disposed above the concave portion 351.

The grip portions 361, of the damping member holding units 36 moved to the side of the damping member main body disposing unit 35, grip both end portions of the damping member 1 and move the damping member holding units 36 outward in the width direction W respectively. As a result, the damping member 1 is extended along the width direction W, and the second slit 14 may become an opening slit through which the engaging claw 133 can be inserted (see FIG. 7B).

In this state, the lifting and lowering plate 33 is lowered downward (−H side) by a motor (not illustrated) provided in the lifting and lowering operation unit 32, and the rotary connector device 100 fitted to the rotary connector device fitting portion 34 is lowered to the −H side so that the engaging claw 133 is inserted through the second slit 14 (see FIGS. 8A and 8B). That is, the engaging portion 130 may be inserted through the insertion portion 15 formed by the first slit 12 and the second slit 14.

After inserting the engaging claw 133 through the second slit 14 in this manner, the damping member holding unit 36 is moved inward in the width direction W to restore the shape of the damping member 1 (see FIG. 8C). As a result, the engaging claw 133 is disposed below the second slit 14.

Finally, by terminating the vacuum generating device, holding of the damping member 1 by the damping member main body disposing unit 35 is released, and the rotary connector device 100, in a state where the damping member 1 is mounted, may be removed from the insertion jig 30. The rotary connector device 100, in which the damping member 1 is mounted to the engaging portion 130, can be assembled to a combination switch (not illustrated) having an engaged portion that can be engaged with and fixed to the engaging portion 130. At this time, the damping member 1 is interposed between the engaged portion provided in the combination switch and the engaging portion 130.

In this manner, for example, the damping member 1 is provided to allow the engaging portion 130 to be inserted through the damping member 1, and the engaging portion is provided in a rotary connector device 100 and engages with an engaged portion, such as a combination switch or the like, provided in a vehicle body side. The engaging portion includes the engaging shaft 132 which extends in an insertion direction (height direction H), and the engaging claw 133 which protrudes from the tip end side of the engaging shaft 132. The damping member 1 is formed of butyl rubber which is an elastically deformable elastic member and comprises the first slit 12 through which the engaging shaft 132 is inserted; and the second slit 14 which extends from the first slit 12 toward the protruding direction side of the engaging claw 133. By configuring that the first slit 12 and the second slit 14 communicate with each other, which allows the engaging portion 130 to be inserted therethrough, that is, by configuring to form the insertion portion 15 through which the engaging portion 130 is inserted between the first slit 12 and the second slit 14, generation of abnormal noise occurring between the rotary connector device 100 and the vehicle body side, which are assembled together, may be prevented.

Specifically, since the damping member 1 is formed of an elastic member, by applying a pulling force, the pulling force for pulling both end sides in the width direction W toward the outside, to both ends of the damping member main body portion 11 in the width direction W, the member forming the second slit 14 can be elongated in the width direction W, and the second slit 14 can be an opening through which the engaging claw 133 can be inserted so that the engaging shaft 132 and the engaging claw 133 can be inserted through the first slit 12 and the second slit 14.

In addition, since the first slit 12 has a desired spacing with respect to the width direction W and the protruding direction (the depth direction D), even when the pulling force is released, the engaging shaft 132 keeps inserted, and the warping of the first slit 12 can be prevented due to the interference with the first convex portion 21 and the second convex portion 22 constituting the second slit 14 so that the damping member 1 can be appropriately disposed between the engaging portion 130 and the engaged portion. Thus, it is possible to prevent the occurrence of abnormal noise occurring between the rotary connector device 100 and the vehicle body side due to the vibration of the vehicle body or the like.

Further, the second slit 14 is provided, with respect to the first slit 12, between the first convex portion 21 and the second convex portion 22 which are a pair of convex portions disposed so as to oppose each other from both sides in the forming direction (width direction W) of the first slit 12 so that the second slit 14 is formed in the center of the damping member 1, and a pulling force for inserting the engaging claw 133 can be substantially uniformly applied to the damping member 1.

As a result, in a state where the damping member main body portion 11 is fixed, the first convex portion 21 and the second convex portion 22 are pulled substantially equally toward both ends, and a space for inserting the engaging claw can be formed in the central portion in the width direction W so that the engaging claw 133 to be inserted can be easily inserted without being caught by one of the first convex portion 21 or the second convex portion 22.

Furthermore, since the pulling force acting on both ends can be made substantially uniform, it is possible to prevent a load from being applied to one side in the width direction W.

In addition, since the third slit 13, which is formed along the same direction as the first slit 12 and communicates with the second slit 14, is provided on the side opposite to the first slit 12, the engaging shaft 132 can be reliably inserted through the first slit 12.

Specifically, in the damping member 1 in which the third slit 13 is not provided, when a pulling force which pulls both ends outward in the width direction of the damping member 1 is applied, the first convex portion 21 and the second convex portion 22 are drawn toward the first slit 12 side. As a result, the spacing along the protruding direction of the first slit 12 becomes narrower, so, when the engaging shaft 132 is inserted through the first slit 12, the first convex portion 21 and the second convex portion 22 interfere with the engaging shaft 132.

However, by providing the third slit 13, which communicates with the second slit 14 and is a through-hole in the inserting direction, even if a pulling force is applied to the both ends, the first convex portion 21 and the second convex portion 22 can be prevented from being drawn to the first slit 12 side. That is, the damping member 1 can be stretched in the width direction W while maintaining the shape of the first slit 12, and the first convex portion 21 and the second convex portion 22 are prevented from interfering with the engaging shaft 132, which allows the engaging shaft 132 to be reliably inserted (see FIG. 8B).

Further, in the damping member 1, the opposing surfaces (the W side face 21*d* and the W side face 22*d*) of the first convex portion 21 and the second convex portion 22 contact each other in the width direction W, and even when the pulling force applied to both sides in the direction W is released after the engaging claw 133 is inserted, the engaging shaft 132 is surrounded by the surfaces forming the first slit 12 (see FIG. 8C). That is, it is possible to increase the contact area between the first convex portion 21, the second convex portion 22, or the like, which forms the first slit 12, and the engagement shaft 132, thus preventing the damping member 1 from rotating around the engaging shaft 132.

Similarly to the damping member 1, the damping member 1*x* according to another embodiment can allow the engaging portion 130 to be inserted using the insertion jig 30.

Briefly describing below, the damping member holding unit 36 grips both ends, in the width direction W, of the damping member 1*x* disposed in the damping member main body disposing unit 35, and by moving the damping member holding unit 36 outward in the width direction W, the damping member 1*x* is pulled outward in the width direction W. As a result, the second slit 14*x* can be opened to such an extent as to allow the engaging claw 133 to be inserted therethrough so that the engaging claw 133 can be inserted through the second slit 14*x*. In this manner, the damping member 1*x*, which can allow the engaging shaft 132 and the engaging claw 133 to be inserted through the first slit 12 and the second slit 14*x*, has the same effect as the damping member 1, as well as the specific effect of the damping member 1*x*.

Hereinafter, the specific effect of the damping member 1*x* will be described with reference to FIG. 9.

Figure 9A:
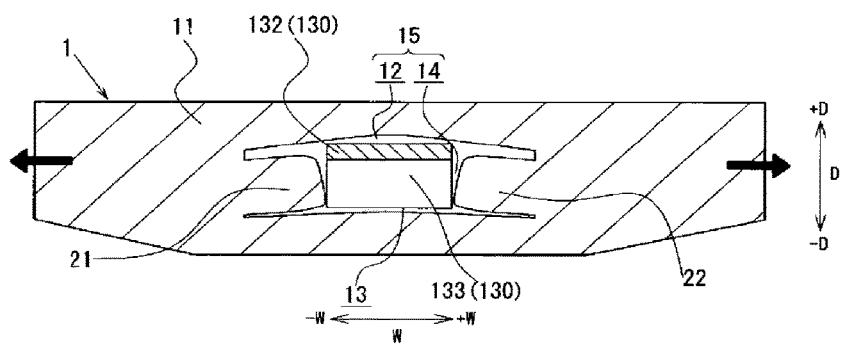
FIG. 9 is an explanatory view of a damping member, according to the second embodiment, through which an engaging portion is inserted.
Figure 9B:
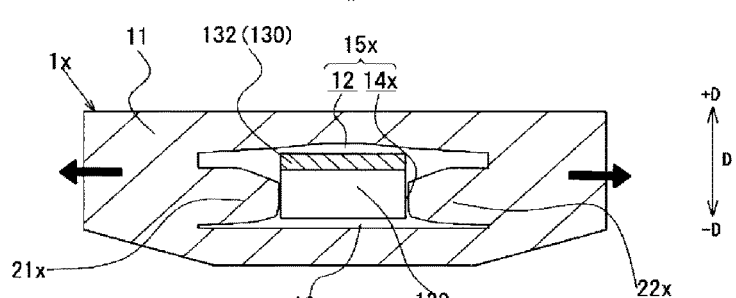
Figure 9C:
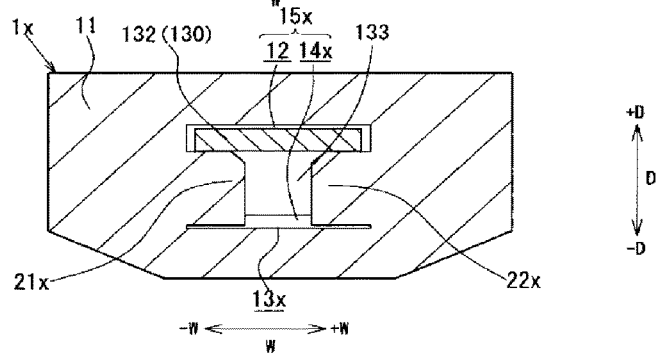

FIG. 9 is an explanatory view of a state in which the engaging portion 130 is inserted through the damping member 1*x*. Specifically, FIG. 9A is a cross sectional view corresponding to the view taken in the direction of the arrow F-F in FIG. 8A in the damping member 1 through which the engaging portion 130 is inserted in the state of being stretched. FIG. 9B is a cross sectional view corresponding to the view taken in the direction of the arrow F-F in FIG. 8A in the damping member 1*x* through which the engaging portion 130 is inserted in the state of being stretched. FIG. 9C is a cross sectional view corresponding to the view of the arrow F-F in FIG. 8A in the damping member 1*x* in a state where the stretching is released.

Unlike the damping member 1, the damping member 1*x* has the W side face 21*d* and the W side face 22*d* spaced apart from each other by a predetermined distance, so it is possible to reduce the distance of movement of the damping member holding unit 36 for forming an opening, in the second slit 14*x*, through which the engaging claw 133 is inserted, as compared with the case of the damping member 1. That is, the pulling force for pulling the damping member 1x outward in the width direction W (see FIGS. 9A and 9B) can be reduced.

In this manner, since the opposing surfaces (the W side face 21d and the W side face 22d) of the first convex portion 21 and the second convex portion 22 are spaced apart from each other by a predetermined distance, even if the pulling force acting on both end sides in the width direction W toward the outside is weakened, it is possible to form the opening, through which the engaging claw 133 is inserted, formed by the first convex portion 21 and the second convex portion 22.

Further, since the pulling force can be weakened, the load acting on the damping member 1 can be reduced.

Furthermore, since the tapered surface 21c and the tapered surface 22c are formed on the first slit 12 side of the opposing surfaces of the first convex portion 21 and the second convex portion 22, when pulling force is applied to both end sides in the width direction W, the space in the central portion of the first slit 12 can be enlarged, so it is possible to reduce the contact area between the first convex portion 21 and the second convex portion 22, which may come into contact with the engaging shaft 132 and the engaging claw 133 when inserting the engaging portion 130. Therefore, the first convex portion 21 and the second convex portion 22 can be prevented from interfering with the engaging claw 133 or the like to warp.

Furthermore, by forming the intersection between the first convex portion 21 and the second convex portion 22; and the first slit 12 so as to have a tapered shape inclined inward, the disposing direction in which the damping member 1 is disposed in the damping member main body disposing unit 35 can be easily determined using the tapered shape as a marker.

On the other hand, similarly to the damping member 1, the damping member 1y according to another embodiment allows the engaging shaft 132 and the engaging claw 133 to be inserted through the first slit 12 and the second slit 14y using the insertion jig 30 and has the same effect as the damping member 1, as well as the specific effect of the damping member 1y.

Hereinafter, based on FIG. 10, the specific effect of the damping member 1y will be described.

Figure 10A:
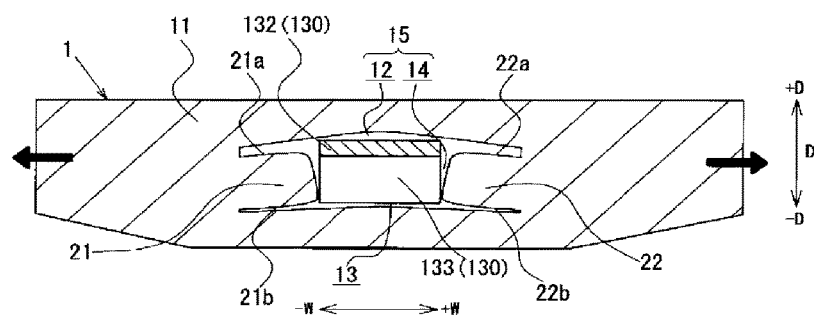
FIG. 10 is an explanatory view of a damping member, according to the third embodiment, through which an engaging portion is inserted.
Figure 10B:
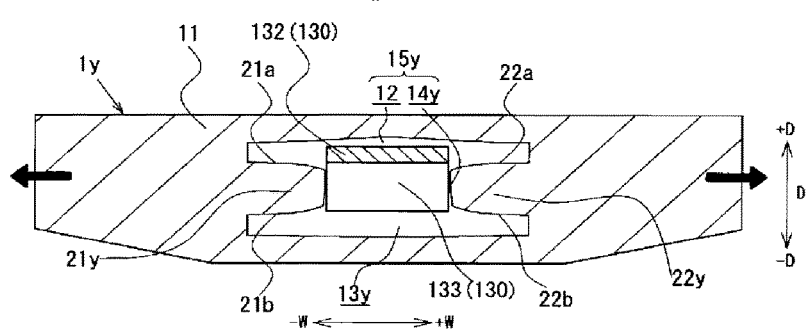
Figure 10C:
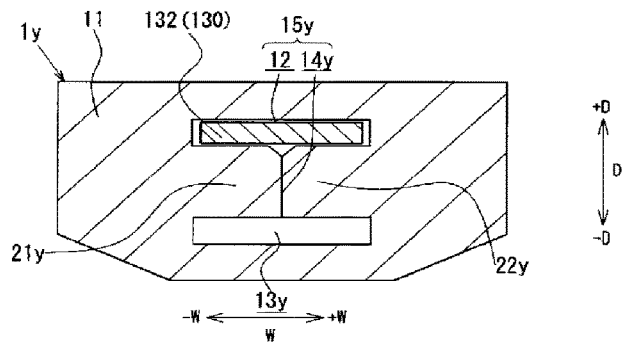

FIG. 10 is an explanatory view of a state in which the engaging portion 130 is inserted through the damping member 1y. Specifically, FIG. 10A is a cross sectional view corresponding to the view taken in the direction of the arrow F-F in FIG. 8A in the damping member 1 through which the engaging portion 130 is inserted in the state of being stretched. FIG. 10B is a cross-sectional view corresponding to the view taken in the direction of the arrow F-F in FIG. 8A in the damping member 1y through which the engaging portion 130 is inserted in the state of being stretched. FIG. 10C is a cross sectional view corresponding to the view of the arrow F-F in FIG. 8A in the damping member 1y in a state where the stretching is released.

Since the third slit 13y of the damping member 1y has the same shape as that of the first slit 12, even when a pulling force is applied to both ends of the damping member 1y in the width direction W, the first convex portion 21y and the second convex portion 22y are pulled along the width direction W, which can prevent more reliably the first convex portion 21y and the second convex portion 22y from being drawn toward the +D side.

Specifically, in the damping member 1 in which the third slit 13 is formed in the cut-shape, as illustrated in FIG. 10A, when the damping member 1 is pulled outward in the width direction W, a difference occurs between the force on +D side face 21a side and +D side face 22a side and the force on −D side face 21b side and −D side face 22b side, so the first convex portion 21 and the second convex portion 22 move to the +D side, and the shape of the first slit 12 becomes an arc shape convex toward the +D side. Therefore, when the pulling force is released, there is a possibility that the engaging shaft 132 interferes with the +D side face 21a and the +D side face 22a, which may cause the first convex portion 21 and the second convex portion 22 to warp.

However, by forming the third slit 13y in the same shape as the first slit 12, it is possible to reduce the difference between the force on the +D side face 21a and the +D side face 22a and the force on the −D side face 21b and the −D side face 22b when the pulling force is applied so that the first convex portion 21 and the second convex portion 22 can be prevented from moving toward the +D side. Therefore, it is possible to prevent the first convex portion 21 and the second convex portion 22 from interfering with the engaging shaft 132 to warp (see FIG. 10B).

Therefore, the engaging shaft 132 can be more reliably inserted through the first slit 12, and even after the pulling force is released, it is possible to prevent the first convex portion 21 and the second convex portion 22 from interfering with the engaging shaft 132 to warp.

In addition, since the shape of the first slit 12 can be maintained even when a pulling force is applied, when the pulling force is released, the first convex portion 21 and the second convex portion 22 return to their original positions, and it is possible to reduce the possibility that the +D side face 21a of the first convex portion 21 and the +D side face 22a of the second convex portion 22 interfere with the engaging shaft 132 to warp.

Furthermore, as the damping member 1x, since the tapered surface 21c and the tapered surface 22c are formed on the first slit 12 side of the opposing surfaces of the first convex portion 21y and the second convex portion 22y, when pulling force is applied outward to both end sides in the width direction W to insert the engaging portion 130, the space in the central portion of the first slit 12 can be enlarged so that it is possible to reduce the contact area between engaging shaft 132 and the engaging claw 133; and the first convex portion 21y and the second convex portion 22y. Therefore, it is possible to prevent the first convex portion 21y and the second convex portion 22y from interfering with the engaging claw 133 or the like to warp.

On the other hand, unlike the damping member 1x, since the damping member 1y abuts on the W side face 21d and the W side face 22d, when the pulling force outward in the width direction W is released from the damping member 1y, it is possible to increase the contact area between the +D side face 21a and the +D side face 22a; and the engaging shaft 132 to prevent the damping member 1y from rotating around the engaging shaft 132. That is, by combining the tapered surface 21c and the tapered surface 22c with the +D side face 21a and the −D side face 22a, it is possible to reliably prevent the first convex portion 21y and the second convex portion 22y from warping, while preventing the rotation of the damping member 1y around the engaging shaft 132.

In the correspondence between the configuration of the invention and the first to third embodiments, the damping member corresponds to the damping members 1, 1x, and 1y; the engaging shaft portion corresponds to the engaging shaft 132; the engaging claw corresponds to the engaging claw 133; the insertion portion and the installation portion correspond to the insertion portion 15 and an installation portion 16 composed of the first slit 12 and the second slit

14, 14*x*, and 14*y*; and the opposing surfaces correspond to the W side face 21*d* and the W side face 22*d*. However, the disclosure is not limited to the configuration of the above embodiments only, and many embodiments can be obtained.

For example, the configurations of the first to third embodiments may be combined respectively.

In detail, the tapered surface 21*c* and the tapered surface 22*c* may not be provided in the second embodiment, and in the first embodiment and the second embodiment, the third slit 13 may have the same shape as that of the first slit 12.

Furthermore, in the first to third embodiments, the second slit 14 is orthogonally connected to the central portion of the first slit 12 and the third slit 13, but the second slit 14 may be inclined to the first slit 12.

However, from the perspective of reducing the load based on the pulling force applied to the damping member 1, it is preferable that the second slit 14 may be orthogonally connected to the central portion of the first slit 12 and the third slit 13, and it is more preferable that the second slit 14 may be orthogonally connected to the first slit 12 and the third slit 13 in the central portion of the damping member main body portion 11.

Further, in the second embodiment, the distance between the W side face 21*d* and the W side face 22*d* can be freely set, but it is desirably shorter than the length in the width direction of the engaging claw 133.

For example, this is due to that, when the distance between the W side face 21*d* and the W side face 22*d* is set to be long, the engaging claw 133 can be easily inserted, but it becomes difficult to reliably mount the damping member 1 to the engaging portion 130.

Other embodiments of the damping member 1 will be briefly described below with reference to FIGS. 11 to 17.

In addition, in the configurations of damping members 1*a* to 1*r* which are other embodiments described below, the same reference numerals are given to the same components as those of the above-described damping members 1, 1*x*, and 1*y*, and description thereof is omitted.

Also, the third slit 13 is not necessarily provided at the end of the second slit 14 but may be provided at a position where the third slit 13 and the second slit 14 intersect each other. Likewise, the first slit 12 may also be provided so as to intersect with the second slit 14.

Figure 11A:
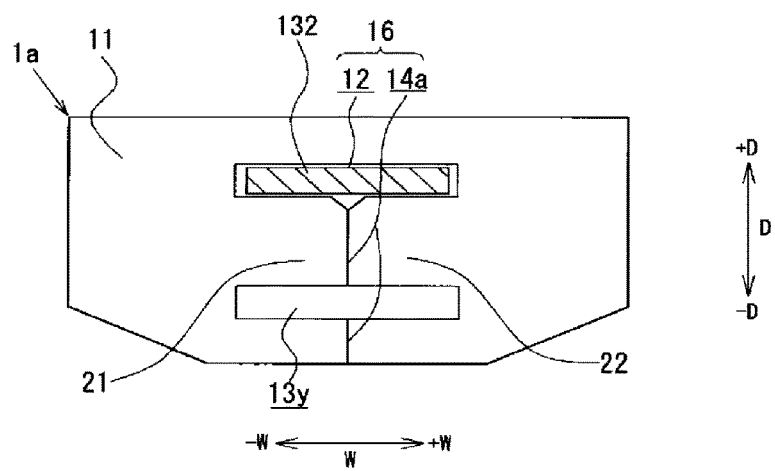
FIG. 11 is a plan view of a damping member according to another embodiment.
Figure 11B:
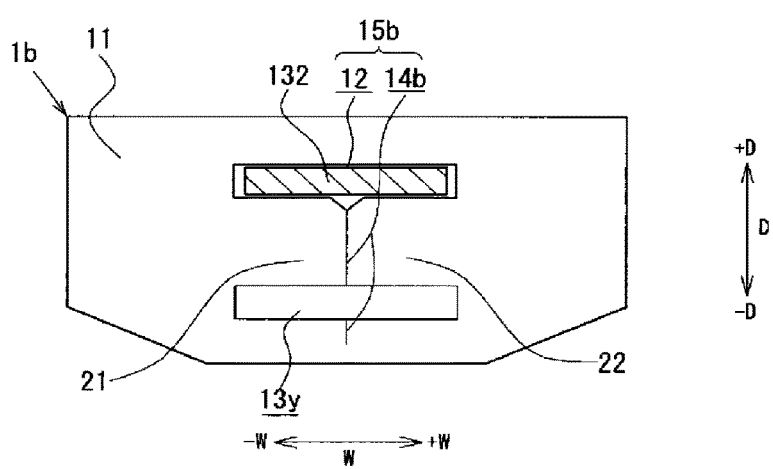
Figure 12A:
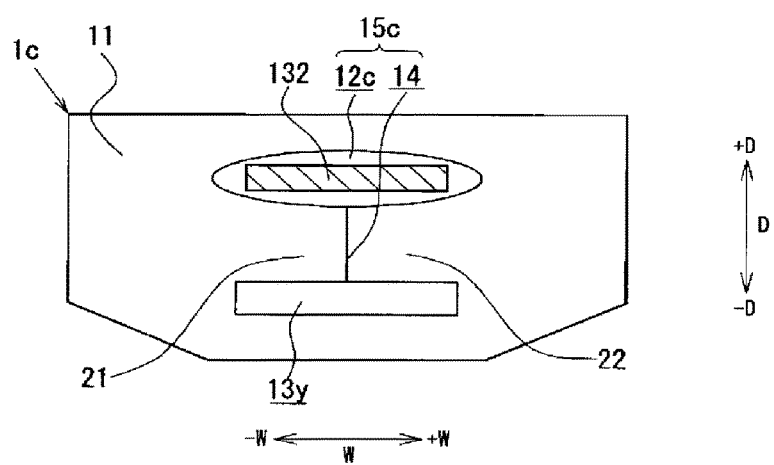
FIG. 12 is a plan view of a damping member according to another embodiment.
Figure 12B:
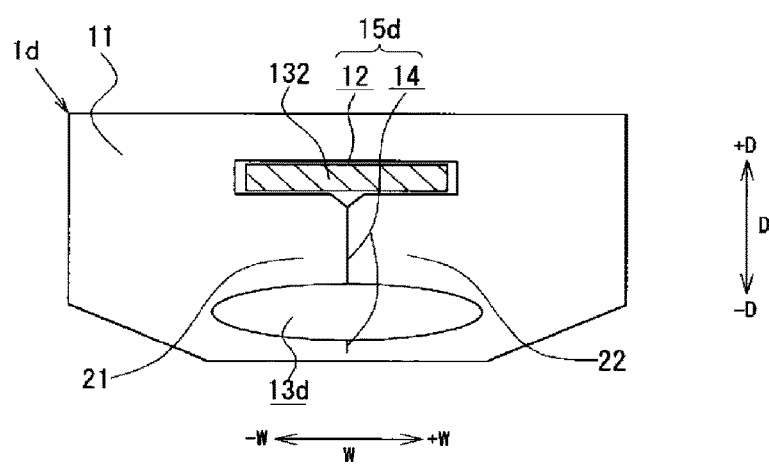

Specifically, as the damping members 1*a* and 1*b* illustrated in FIGS. 11A and 11B, second slits 14*a*, 14*b* formed by the cut-shaped through-hole may be configured to intersect in the depth direction D with the third slit 13*y* formed in a rectangular shape similar to the first slit 12.

In the damping member 1*a* as illustrated in FIG. 11A, the second slit 14*a* is configured to reach the −D side end of the damping member main body portion 11, and the first slit 12 and the second slit 14*a* may form the installation portion 16. On the other hand, in the damping member 1*b* illustrated in FIG. 11B, the second slit 14*b* is configured to not reach the −D side end portion of the damping member main body portion 11, and the first slit 12 and the second slit 14*b* may form an insertion portion 15*b*.

For example, in the damping member 1*a* illustrated in FIG. 11A, the engaging portion 130 is not inserted into the first slit 12 and the second slit 14*a* (installation portion 16) after pulling the damping member main body portion 11 toward both end sides in the width direction W, but the engaging portion 130 (the engaging shaft 132) is inserted through the first slit 12 and the second slit 14*a* (installation portion 16) through the opening portion formed at the −D side end portion of the second slit 14*a*, and the engaging portion 130 can be installed in a state of being inserted through the first slit 12. Note that even for the damping member 1*a* illustrated in FIG. 11A, after the damping member main body portion 11 is pulled toward both end sides in the width direction W, the engaging portion 130 can be inserted through the first slit 12 and the second slit 14 from above.

In first to third embodiments, the first slit 12 and the third slit 13 are formed in a rectangular shape, but it is not necessary to have a rectangular shape. For example, as in the damping member 1*c* of FIG. 12A, a first slit 12*c* may be an elliptical through-hole or the like, and the first slit 12*c* and the second slit 14 may form an insertion portion 15*c*. As the damping member 1*d* illustrated in FIG. 12B, a third slit 13*d* may be an elliptical through-hole or the like. Besides, both the first slit 12 and the third slit 13 may have an elliptical shape, it is not necessary to limit the shape to an elliptical shape, and the shape can be appropriately changed as long as the engaging shaft 132 may be inserted.

Also, in the first to third embodiments, the third slit 13 is provided, but the third slit 13 may not be provided in the first to third embodiments. Furthermore, the second slit 14 may not be extended along the depth direction D, but may be provided so as to be bifurcated, as the damping members 1*e* and 1*f* illustrated in FIGS. 13A and 13B.

Figure 13A:
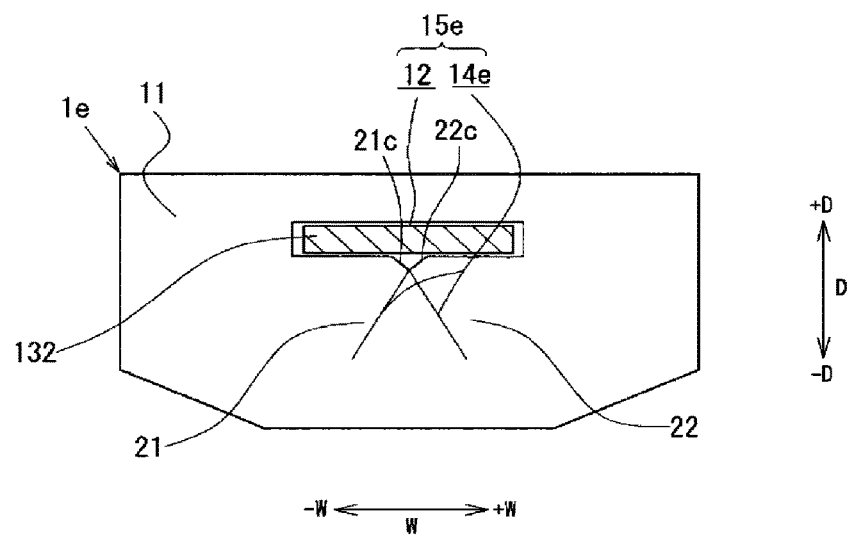
FIG. 13 is a plan view of a damping member according to another embodiment.

Specifically, in the damping member 1*e* illustrated in FIG. 13A, two second slits 14*e*, which are through-holes formed in a cut-shape, are provided toward the −D side from the intersecting portions of the tapered surface 21*c* and the tapered surface 22*c* forming part of the first slit 12, and an insertion portion 15*e* is configured by the first slit 12 and the second slit 14*e*. In addition, the two second slits 14*e* extend at an angle of 30 degrees with respect to the depth direction D.

Figure 13B:
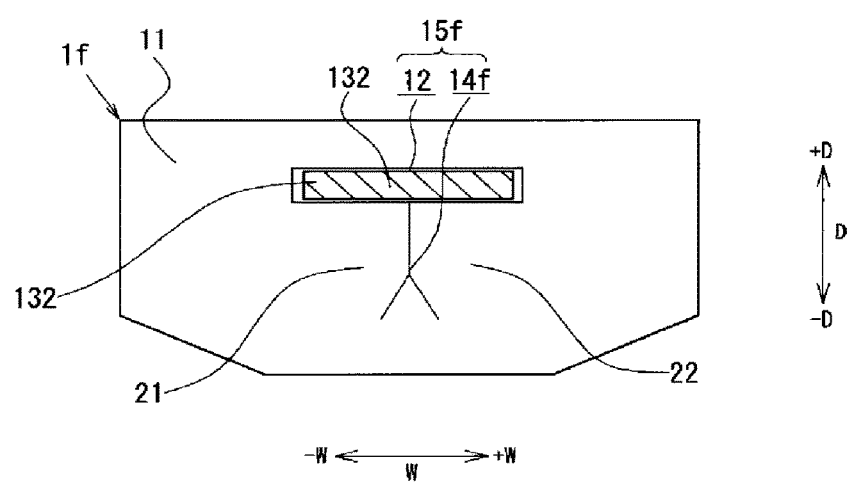

Further, as in the damping member 1*f* illustrated in FIG. 13B, the end portion on the −D side of a second slit 14*f* which is a cut-shaped through-hole may be configured to be bifurcated, and an insertion portion 15*f* may be configured by the first slit 12 and the second slit 14*f*.

Figure 14A:
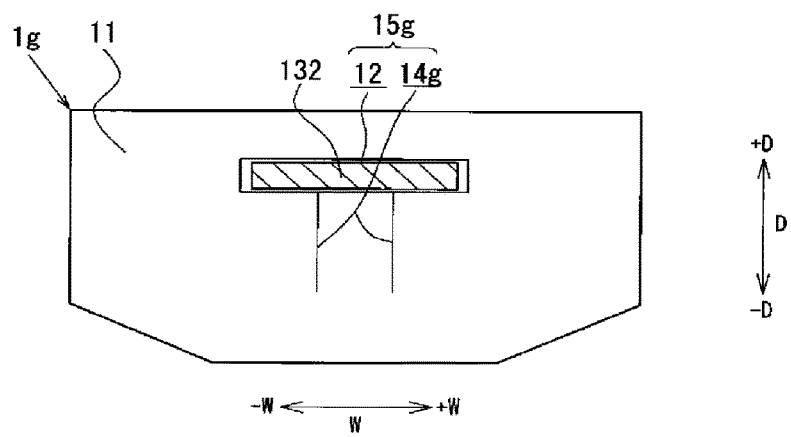
FIG. 14 is a plan view of a damping member according to another embodiment.
Figure 14B:
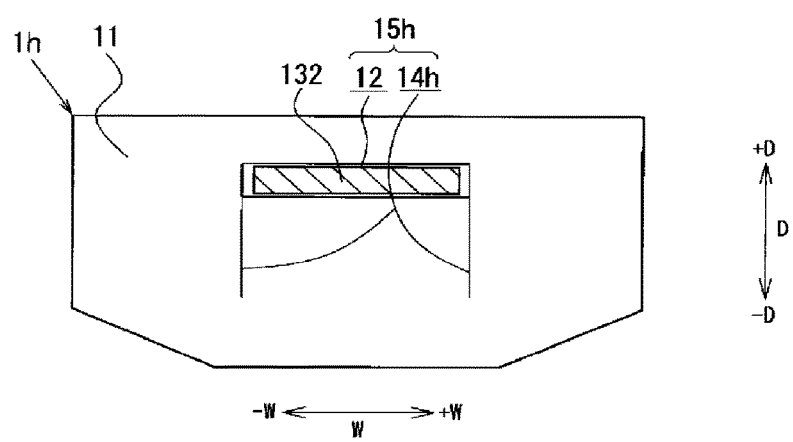

Further, two second slits 14*g* connected to the first slit 12 may be provided as the damping members 1*g*, 1*h* illustrated in FIGS. 14A and 14B, and an insertion portion 15*g* may be configured by the first slit 12 and the second slits 14*g*. For example, in the damping member 1*g* illustrated in FIG. 14A, the second slits 14*g*, which are two cut-shaped through-holes, extends from the central portion of the first slit 12 toward the −D side. On the other hand, in the damping member 1*h* illustrated in FIG. 14B, second slits 14*h*, which are two cut-shaped through-holes, extends from the ends of the first slit 12 in the width direction W toward the −D side, and an insertion portion 15*h* may be configured by the first slit 12 and the second slit 14*h*.

With such a configuration, when a pulling force is applied to both sides of the damping member 1 in the width direction W, a portion surrounded by the first slit 12 and the second slit 14 is lowered to the −H side so that a through-hole is formed in the central portion through which the engaging claw 133 can pass. Therefore, by releasing the pulling force acting on the damping member 1 after passing the engaging portion 130 through the damping member 1, the damping member 1 can be mounted to the engaging portion 130.

Figure 14C:
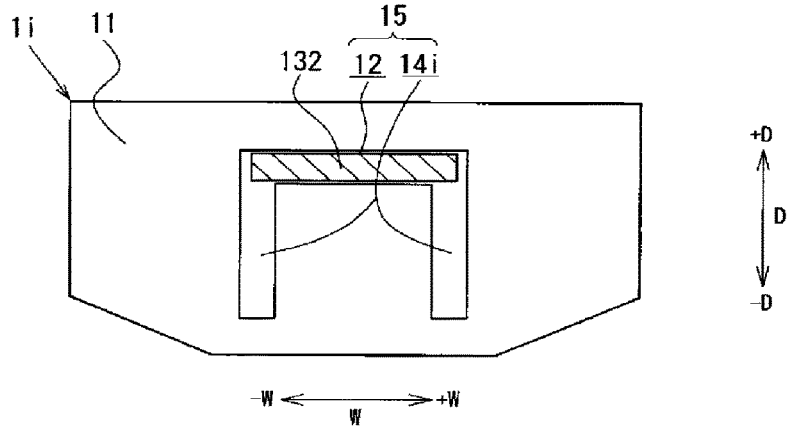

Further, as the damping member 1*i* illustrated in FIG. 14C, the second slit 14 may not be a cut-shaped through-hole but a second slit 14*i* which is a through-hole having a width as the second slit 14*x* in the second embodiment, and an insertion portion 15*i* may be configured by the first slit 12 and the second slits 14*i*.

In the first to third embodiments, the damping member 1 is configured so as to be bilaterally symmetrical with respect to the central axis in the width direction W in a plan view, but it is not necessarily required to be bilaterally symmetrical. For example, as illustrated in FIG. 15, the second slit 14 may be provided at the end portion on the D side of the first slit 12.

Figure 15A:
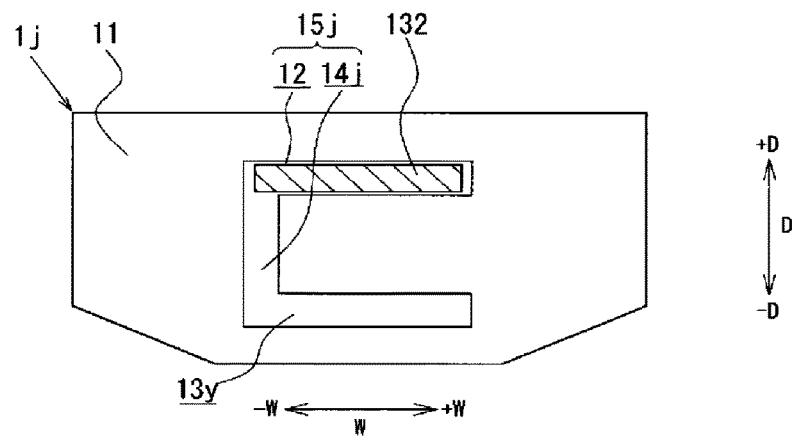
FIG. 15 is a plan view of a damping member according to another embodiment.

Specifically, as the damping member 1j illustrated in FIG. 15A, a second slit 14j is provided, which is a through-hole having a width and extends toward the −D side from the −W side end portion of the first slit 12, the third slit 13y is provided so as to extend from the lower end of the second slit 14j toward the +W side, and an insertion portion 15j may be configured by the first slit 12 and the second slit 14j. Further, as the damping member 1k illustrated in FIG. 15B, a second slit 14k may be provided so as to extend toward the −D side from the +W side end portion of the first slit 12, and the third slit 13y may be provided so as to extend toward the −W side from the lower end of the second slit 14k, and an insertion portion 15k may be configured by the first slit 12 and the second slit 14k.

Figure 15B:
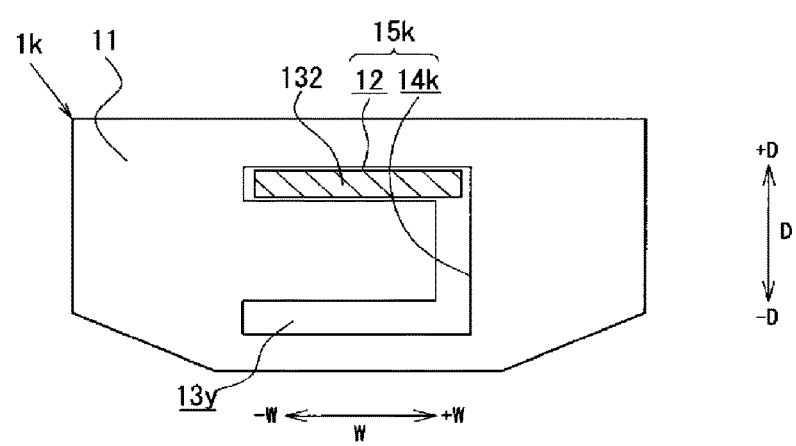
Figure 15C:
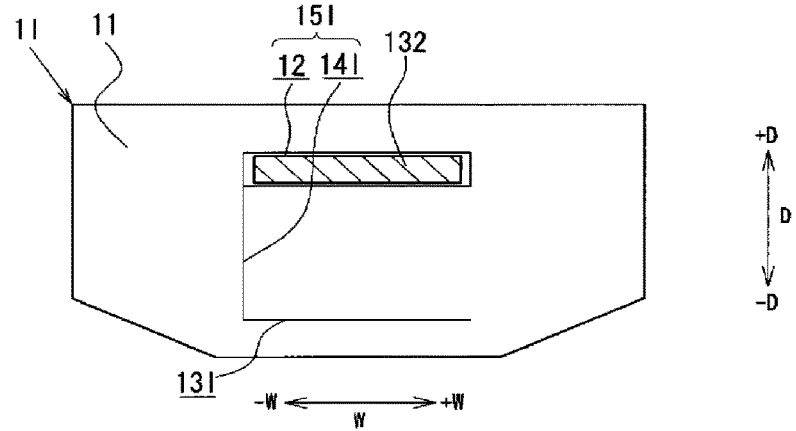

In addition, in the damping members 1j, 1k illustrated in FIGS. 15A and 15B, the second slit 14 and the third slit 13y are configured respectively by through-holes having predetermined widths. However, for example, as the damping member 1l illustrated in FIG. 15C, they may be configured by a second slit 14l and a third slit 13l which are cut-shaped through-holes, and an insertion portion 15l may be configured by the first slit 12 and the second slit 14l. Alternatively, one of the second slit 14l or the third slit 13l may be formed of a cut-shaped through-hole and the other may be a through-hole having a predetermined width.

In the above example, the second slit 14j or the like are not necessarily disposed at the ends in the width direction W, and the positions thereof may be changed appropriately.

Furthermore, in the embodiments mentioned above, the second slit 14 is configured to extend from the −D side end portion of the first slit 12 to the −D side. However, for example, as the damping member 1m illustrated in FIG. 16A, second slits 14m may be configured to extend from both end portions of the first slit 12 in the width direction W toward the +D side and the −D side. Note that the second slit 14m extending toward the ±D side of the first slit 12 is not necessarily provided at the end portion in the width direction W of the first slit 12 but may be provided in the center in a plan view of the first slit 12, or at a position deviated to the ±W side from the center in a plan view. Also, an insertion portion 15m may be configured by the first slit 12 and the second slit 14m.

Figure 16A:
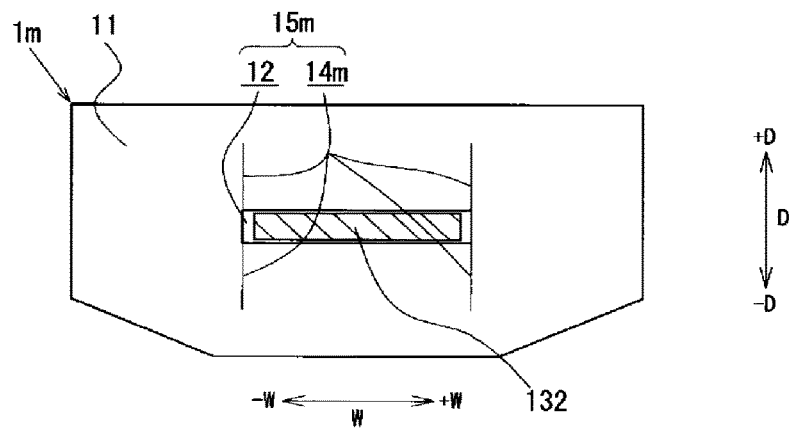
FIG. 16 is a plan view of a damping member according to another embodiment.
Figure 16B:
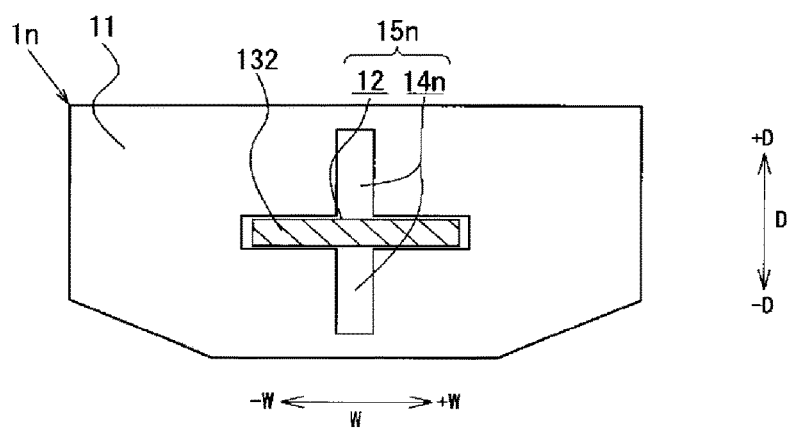

Further, when the second slit 14m extends in the ±D direction of the first slit 12, the second slit 14m is not necessarily limited to a cut-shaped through-hole, but as the damping member 1n illustrated in FIG. 16B, it may be configured by a second slit 14n which is a through-hole having a predetermined width and extends toward the +D side and the −D side at the center of the first slit 12 in a plan view, and an insertion portion 15n may be configured by the first slit 12 and the second slit 14n.

Figure 16C:
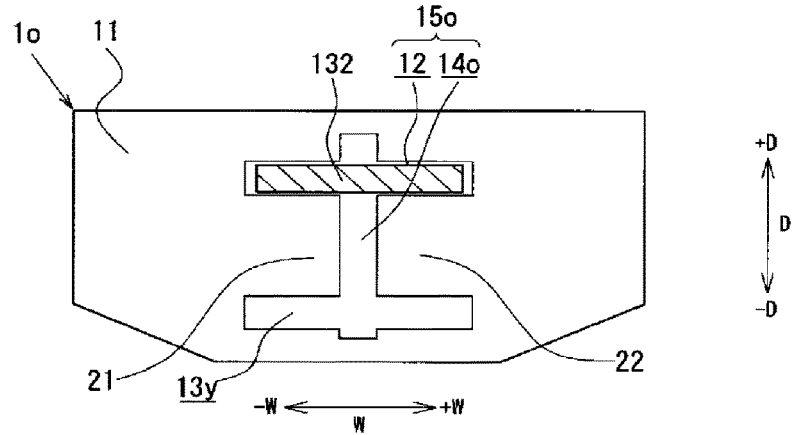

Furthermore, as the damping member 1o illustrated in FIG. 16C, the third slit 13y may be provided on the −D side of a second slit 14o. The third slit 13y is not necessarily provided at the −D side end portion of the second slit 14o, but on the +D side of the lower end of the second slit 14o, and an insertion portion 15o may be configured by the first slit 12 and the second slit 14o.

In the above embodiments, each first slit 12 is disposed on the +D side and each second slit 14 is formed toward the −D direction. When the third slit 13 is provided, the third slit 13y is provided on the −D side, but the disposing position of the first slit 12 or the like can be appropriately changed.

Figure 17A:
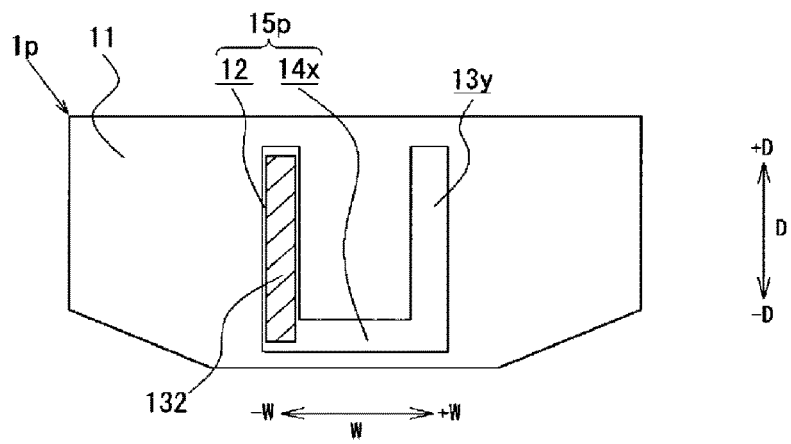
FIG. 17 is a plan view of a damping member according to another embodiment.
Figure 17B:
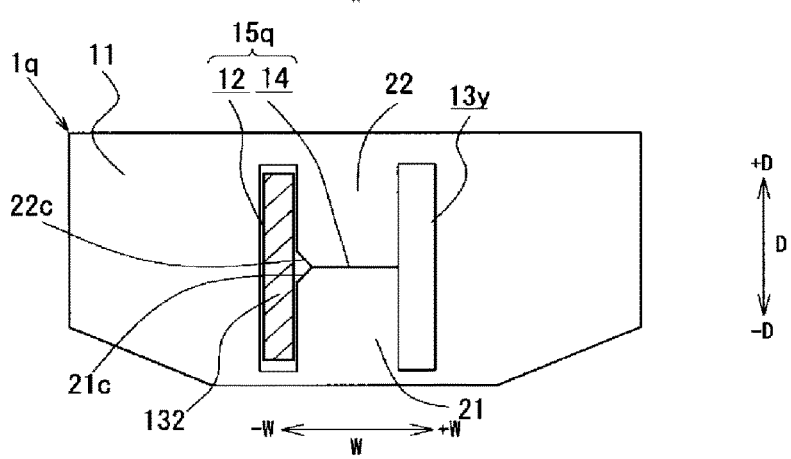
Figure 17C:
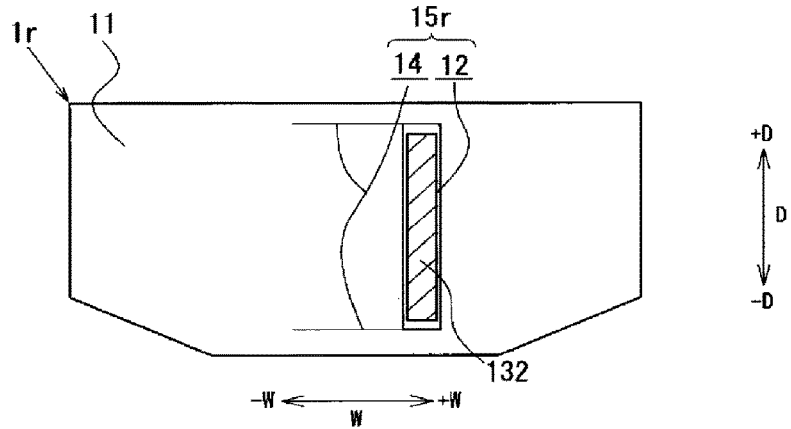

That is, as the damping members 1p, 1q and 1r illustrated in FIGS. 17A to 17C, the first slit 12 may be disposed on the −D side and the third slit 13y may be disposed on the +D side, or the first slit 12 may be disposed along the depth direction D on the +W side and the second slit 14 may be provided along the width direction W.

In FIGS. 17A to 17C, insertion portions 15p, 15q, and 15r may be configured by the first slit 12 and the second slit 14 and 14x.

In addition, by mounting the damping member 1 to the engaging portion 130 using the insertion jig 30, it is possible to prevent an error from occurring when mounting and also possible to provide a highly accurate rotary connector device with a damping member.

Specifically, the insertion jig 30 includes: the rotary connector device fitting portion 34 which disposes the rotary connector device 100 so that the engaging portion 130 provided in the rotary connector device 100 extends along the insertion direction; the lifting and lowering operation units 32 for moving the rotary connector device fitting portion 34 along the insertion direction; the damping member main body disposing unit 35 which disposes the damping member 1 through which the engaging portion 130 is inserted; and the damping member holding unit 36 which has the grip portion 361 for gripping the damping member 1 disposed in the damping member main body disposing unit 35 in the width direction W of the damping member 1 and which is capable of moving along the width direction W. The damping member main body disposing unit 35 includes the concave portion 351 recessed in the insertion direction, and the vacuum hole 352 corresponding to the damping member fixing portion for fixing the damping member 1. The engaging portion 130 of the rotary connector device 100, which is disposed in the rotary connector device fitting portion 34, is disposed so as to oppose the concave portion 351 corresponding to the engaging portion insertion hole.

With such a configuration, the rotary connector device 100 disposed in the insertion jig 30 can be moved in the insertion direction, and can be inserted through the damping member 1 which is fixed to the damping member main body disposing unit 35. At this time, the engaging portion 130 pass through the damping member 1 and is inserted through the concave portion 351.

REFERENCE SIGNS LIST 1, 1x, 1y Damping member
12 First slit
13, 13x, 13y Third slit
14, 14x, 14y Second slit
15, 15x, 15y Insertion portion
16 Installation portion
21 First convex portion
22 Second convex portion
21c Tapered surface
21d W side face
22c Tapered surface
22d W side face
100 Rotary connector device
130 Engaging portion
132 Engaging shaft portion
133 Engaging claw portion

The invention claimed is:

1. A damping member configured to allow an engaging portion to be inserted through the damping member, the engaging portion being provided in a rotary connector device and including an engaging shaft portion which extends in a predetermined direction and an engaging claw portion which protrudes from the engaging shaft portion,
the damping member being formed of an elastic material and comprising:
a first slit through which the engaging shaft portion is inserted; and
a second slit extending from the first slit toward the protruding direction side of the engaging claw portion,
the first slit and the second slit communicating with each other to provide an insertion portion through which the engaging portion is inserted, wherein the second slit is provided between a pair of convex portions that is disposed to oppose each other from both sides in a forming direction of the first slit, with respect to the first slit.

2. The damping member according to claim 1, wherein the opposing surfaces of the pair of convex portions are disposed with a predetermined distance.

3. The damping member according to claim 1, wherein the opposing surfaces of the pair of convex portions are in contact with each other.

4. The damping member according to claim 1, wherein a tapered surface is provided on an opposing side of the pair of convex portions and on the side of the first slit.

5. A damping member configured to allow an engaging portion to be inserted through the damping member, the engaging portion being provided in a rotary connector device and including an engaging shaft portion which extends in a predetermined direction and an engaging claw portion which protrudes from the engaging shaft portion,
the damping member being formed of an elastic material and comprising:
a first slit through which the engaging shaft portion is inserted; and
a second slit extending from the first slit toward the protruding direction side of the engaging claw portion,
the first slit and the second slit communicating with each other to provide an insertion portion through which the engaging portion is inserted, wherein the second slit is provided between a pair of convex portions that is disposed to oppose each other from both sides in a forming direction of the first slit, with respect to the first slit, wherein a third slit formed in the same direction as the first slit and being in communication with the second slit is provided on a side opposite to the first slit.

6. The damping member according to claim 5, wherein the third slit has the same shape as the first slit.

7. The rotary connector device in which the damping member of claim 1 is provided, the rotary connector device comprising:
an annular fixed body having a connector portion to which a connection connector of an external electrical device is connected; and
a rotating body fitted to the fixed body so as to be relatively rotatable to form an annular housing space between the fixed body and the rotating body, wherein the
engaging portion engaging with an engaged portion provided on a vehicle body side,
the engaging portion being allowed to be inserted through the first slit of the damping member so that the rotary connector device is provided with the damping member.

8. A damping member configured to allow an engaging portion to be inserted through the damping member, the engaging portion being provided in a rotary connector device and including an engaging shaft portion which extends in a predetermined direction and an engaging claw portion which protrudes from the engaging shaft portion,
the damping member being formed of an elastic material and comprising:
a first slit through which the engaging shaft portion is installed; and
a second slit extending from the first slit toward the protruding direction side of the engaging claw portion,
the first slit and the second slit communicating with each other to provide an installation portion through which the engaging portion is installed, wherein the second slit is provided between a pair of convex portions that is disposed to oppose each other from both sides in a forming direction of the first slit, with respect to the first slit.

9. The damping member according to claim 2 wherein a tapered surface is provided on an opposing side of the pair of convex portions and on the side of the first slit.

10. The damping member according to claim 3 wherein a tapered surface is provided on an opposing side of the pair of convex portions and on the side of the first slit.

11. The damping member according to claim 1, wherein a third slit formed in the same direction as the first slit and being in communication with the second slit is provided on a side opposite to the first slit.

12. The rotary connector device in which the damping member of claim 1 is provided, the rotary connector device comprising:
an annular fixed body having a connector portion to which a connection connector of an external electrical device is connected; and
a rotating body fitted to the fixed body so as to be relatively rotatable to form an annular housing space between the fixed body and the rotating body, wherein the
and
engaging portion engaging with an engaged portion provided on a vehicle body side,
the engaging portion being allowed to be inserted through the first slit of the damping member so that the rotary connector device is provided with the damping member.

13. The rotary connector device in which the damping member of claim 5 is provided, the rotary connector device comprising:
an annular fixed body having a connector portion to which a connection connector of an external electrical device is connected; and
a rotating body fitted to the fixed body so as to be relatively rotatable to form an annular housing space between the fixed body and the rotating body, wherein the
engaging portion engaging with an engaged portion provided on a vehicle body side,
the engaging portion being allowed to be inserted through the first slit of the damping member so that the rotary connector device is provided with the damping member.

* * * * *